US010394082B2

(12) United States Patent
Kim et al.

(10) Patent No.: US 10,394,082 B2
(45) **Date of Patent: *Aug. 27, 2019**

(54) CURVED DISPLAY DEVICE

(71) Applicant: Samsung Display Co., Ltd., Yongin, Gyeonggi-Do (KR)

(72) Inventors: Su Jeong Kim, Seoul (KR); Kichul Shin, Seongnam-si (KR); Jae Hoon Jung, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 559 days.

This patent is subject to a terminal disclaimer.

(21) Appl. No.: 14/673,085

(22) Filed: Mar. 30, 2015

(65) Prior Publication Data

US 2015/0277189 A1 Oct. 1, 2015

(30) Foreign Application Priority Data

Mar. 31, 2014 (KR) ........................ 10-2014-0037611
Mar. 16, 2015 (KR) ........................ 10-2015-0036079

(51) Int. Cl.
*G02F 1/1337* (2006.01)
*G02F 1/1333* (2006.01)

(52) U.S. Cl.
CPC .................. *G02F 1/133707* (2013.01); *G02F 2001/133757* (2013.01)

(58) Field of Classification Search
CPC ....... G02B 27/26; G02B 5/3083; H04N 13/00
See application file for complete search history.

(56) References Cited

U.S. PATENT DOCUMENTS 6,201,588 B1 3/2001 Walton et al.
7,386,161 B2 6/2008 Weiss et al.
(Continued)

FOREIGN PATENT DOCUMENTS

JP 2002214613 A 7/2002
JP 3422938 B2 4/2003
(Continued)

OTHER PUBLICATIONS

David Murphy, The Technology Behind LG's "Dual Play" TV: Two Simultaneous Images, One Panel!, Sep. 5, 2011.*

*Primary Examiner* — Joseph L Williams
*Assistant Examiner* — Jacob R Stern
(74) *Attorney, Agent, or Firm* — Cantor Colburn LLP

(57) ABSTRACT

A curved display device includes a display substrate curved in a first direction, an opposite substrate coupled to the display substrate, where the opposite substrate is curved together with the display substrate, and a liquid crystal layer including liquid crystal molecules disposed between the display substrate and the opposite substrate. The opposite substrate includes a common electrode and a first alignment layer disposed on the common electrode, where the first alignment layer aligns a first portion of the liquid crystal molecules at a first pretilt angle. The display substrate includes: a pixel electrode, where a plurality of slits is defined in the pixel electrode; and a second alignment layer disposed on the pixel electrode, where the second alignment layer aligns a second portion of the liquid crystal molecules at a second pretilt-angle, which is less than the first pretilt-angle.

37 Claims, 23 Drawing Sheets

(56) References Cited

U.S. PATENT DOCUMENTS

| | | | | |
|---|---|---|---|---|
| 7,956,970 | B2 | 6/2011 | Yamaguchi et al. | |
| 7,986,377 | B2 | 7/2011 | Kim et al. | |
| 2007/0154657 | A1* | 7/2007 | Sha | G02F 1/133753 428/1.6 |
| 2007/0247574 | A1* | 10/2007 | Kudo | G02F 1/133555 349/114 |
| 2010/0060838 | A1 | 3/2010 | Kim et al. | |
| 2010/0182556 | A1 | 7/2010 | Oh et al. | |
| 2011/0157531 | A1 | 6/2011 | Suwa et al. | |
| 2011/0255039 | A1 | 10/2011 | Enomoto | |
| 2013/0155357 | A1 | 6/2013 | Ota | |

FOREIGN PATENT DOCUMENTS

| | | | |
|---|---|---|---|
| JP | 2006154220 | A | 6/2006 |
| JP | 2010097226 | A | 4/2010 |
| KR | 100453364 | B1 | 10/2004 |

* cited by examiner

First Pretilt-Angle = 89°
Second Pretilt-Angle = 89°

First Pretilt-Angle = 89.5°
Second Pretilt-Angle = 88.0°

First Pretilt-Angle = 89.8°
Second Pretilt-Angle = 89.0°

First Pretilt-Angle = 90°
Second Pretilt-Angle = 89°

CURVED DISPLAY DEVICE

This application claims priority to Korean Patent Application No. 10-2014-0037611, filed on Mar. 31, 2014 and Korean Patent Application No. 10-2015-0036079, filed on Mar. 16, 2015, and all the benefits accruing therefrom under 35 U.S.C. § 119, the contents of which in their entireties are herein incorporated by reference.

BACKGROUND

1. Field

The disclosure herein relates to a curved display device, and more particularly, to a curved display device having a curved display area.

2. Description of the Related Art

Display devices are applied to various devices such as televisions, monitors, notebooks, mobile phones, and the like to display an image. In recent years, a curved display device is applied to the display devices. The curved display device is curved in a predetermined direction to provide a curved display area. The curved display device may provide the display area having the curved shape to provide an image having improved three-dimensional effect, immersion, and presence to a user.

SUMMARY

The disclosure provides a curved display device having improved display quality.

Exemplary embodiments of the invention provide a curved display device including: a display substrate curved in a first direction on a plane, an opposite substrate coupled to the display substrate and curved together with the display substrate, and a liquid crystal layer including liquid crystal molecules disposed between the display substrate and the opposite substrate. In such an embodiment, the opposite substrate includes: a common electrode; and a first alignment layer disposed on the common electrode, where the first alignment layer aligns a first portion of the liquid crystal molecules at a first pretilt angle. In such an embodiment, the display substrate includes: a pixel electrode disposed on each of a plurality of pixel areas, where a plurality of slits is defined in the pixel electrode; and a second alignment layer disposed on the pixel electrode, where the second alignment layer aligns a second portion of the liquid crystal molecules at a second pretilt-angle, which is less than the first pretilt-angle.

In another exemplary embodiment, a curved display device includes a display substrate which is curved; an opposite substrate which is curved and disposed opposite to the display substrate; and a liquid crystal layer disposed between the display substrate and the opposite substrate, where the liquid crystal layer includes liquid crystal molecules. In such an embodiment, the opposite substrate includes: a first base substrate; and a first alignment layer disposed between the first base substrate and the liquid crystal layer, and the display substrate includes: a second base substrate; and a second alignment layer disposed between the second base substrate and the liquid crystal layer, where the second alignment layer includes reactive mesogens polymerized with each other. In such an embodiment, first liquid crystal molecules of the liquid crystal molecules, which are adjacent to the first alignment layer, have a first pretilt-angle, and the second liquid crystal molecules of the liquid crystal molecules, which are adjacent to the second alignment layer, have a second pretilt-angle different from the first pretilt-angle.

In another exemplary embodiment, a curved display device includes: a first base substrate which is curved; a first alignment layer including a first base layer disposed on the first base substrate and a plurality of first protrusions disposed on the first base layer; a second base substrate which is curved and disposed opposite to the first base substrate; and a second alignment layer including a second base layer disposed on the second base substrate and a plurality of second protrusions disposed on the second base layer. In such an embodiment, the first protrusions includes first large-size protrusions, each of which has a particle diameter of about 30 nanometers (nm) to about 1,000 nm, and the second protrusions include second large-size protrusions, each of which has a particle diameter of about 30 nm to about 1,000 nm. In such an embodiment, the first base layer includes: a first overlapping area which overlaps the first large-size protrusions; and a first non-overlapping area which does not overlap the first large-size protrusions, and the second base layer includes: a second overlapping area which overlaps the second large-size protrusions; and a second non-overlapping area which does not overlap the second large-size protrusions. In such an embodiment, a ratio of a surface area of first overlapping area to a surface area of second overlapping area is greater than zero (0) and equal to or less than 4/5.

BRIEF DESCRIPTION OF THE DRAWINGS

The above and other feature of the invention will become apparent by describing in further detail exemplary embodiments thereof with reference to the accompanying drawings, in which.

DETAILED DESCRIPTION

Figure 1A:
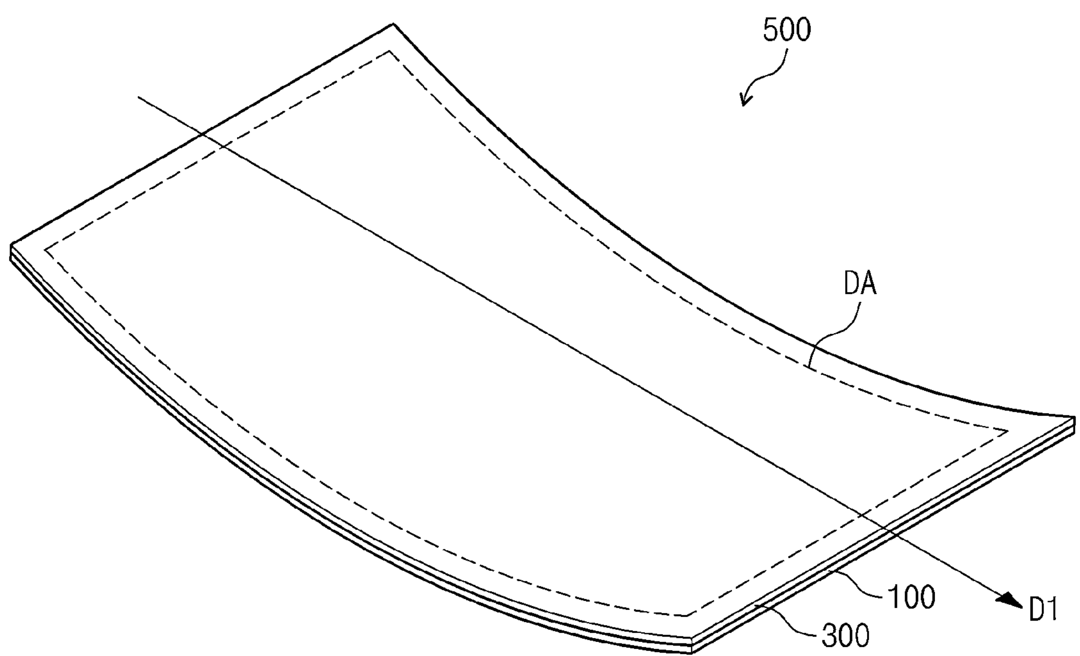
FIG. 1A is a perspective view of an exemplary embodiment of a curved display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in further detail with reference to the accompanying drawings.

Figure 1B:
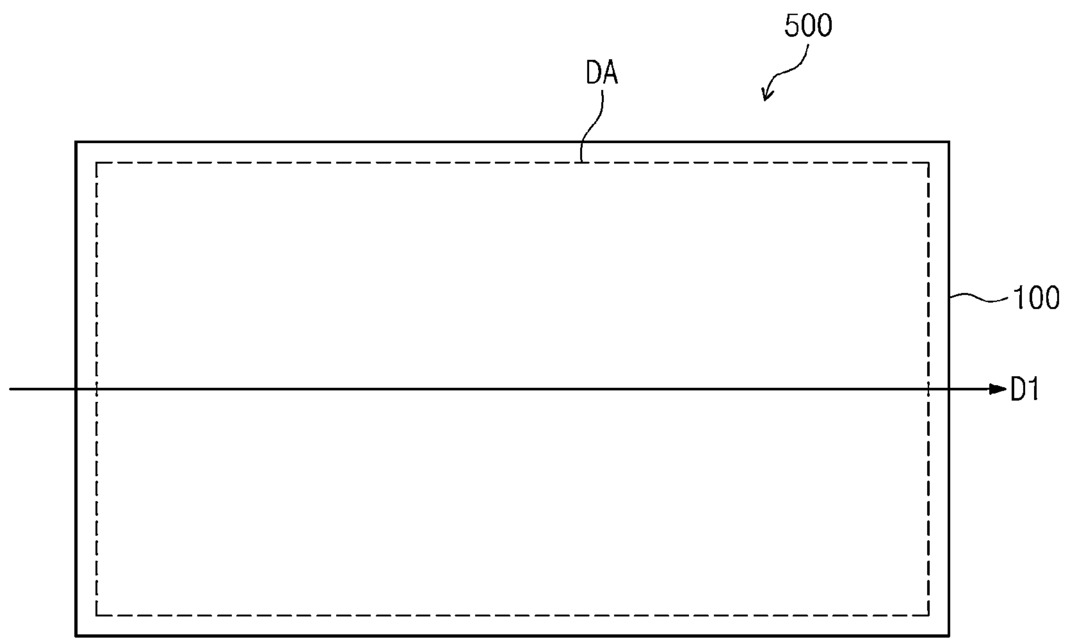
FIG. 1B is a plan view of the curved display device illustrated in FIG. 1A.

FIG. 1A is a perspective view of an exemplary embodiment of a curved display device according to the invention, and FIG. 1B is a plan view of the curved display device illustrated in FIG. 1A.

Figure 1C:
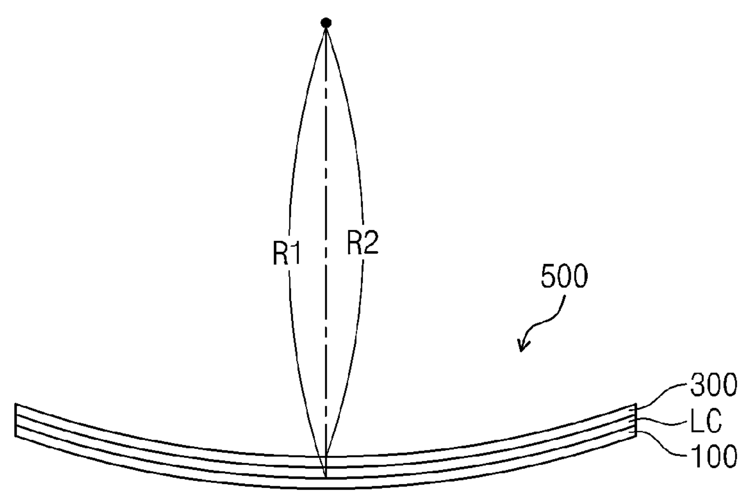
FIG. 1C is a schematic cross-sectional view of an exemplary embodiment of the curved display device according to the invention.

FIG. 1C is a schematic cross-sectional view of an exemplary embodiment of the curved display device according to the invention;

Referring to FIGS. 1A to 1C, an exemplary embodiment of a curved display device 500 has a display area DA on which an image is displayed. The curved display device 500 has a curved shape. Thus, the curved display device 500 may display an image having improved three-dimensional effect, immersion, and presence through the display area DA having the curved shape.

Figure 3A:
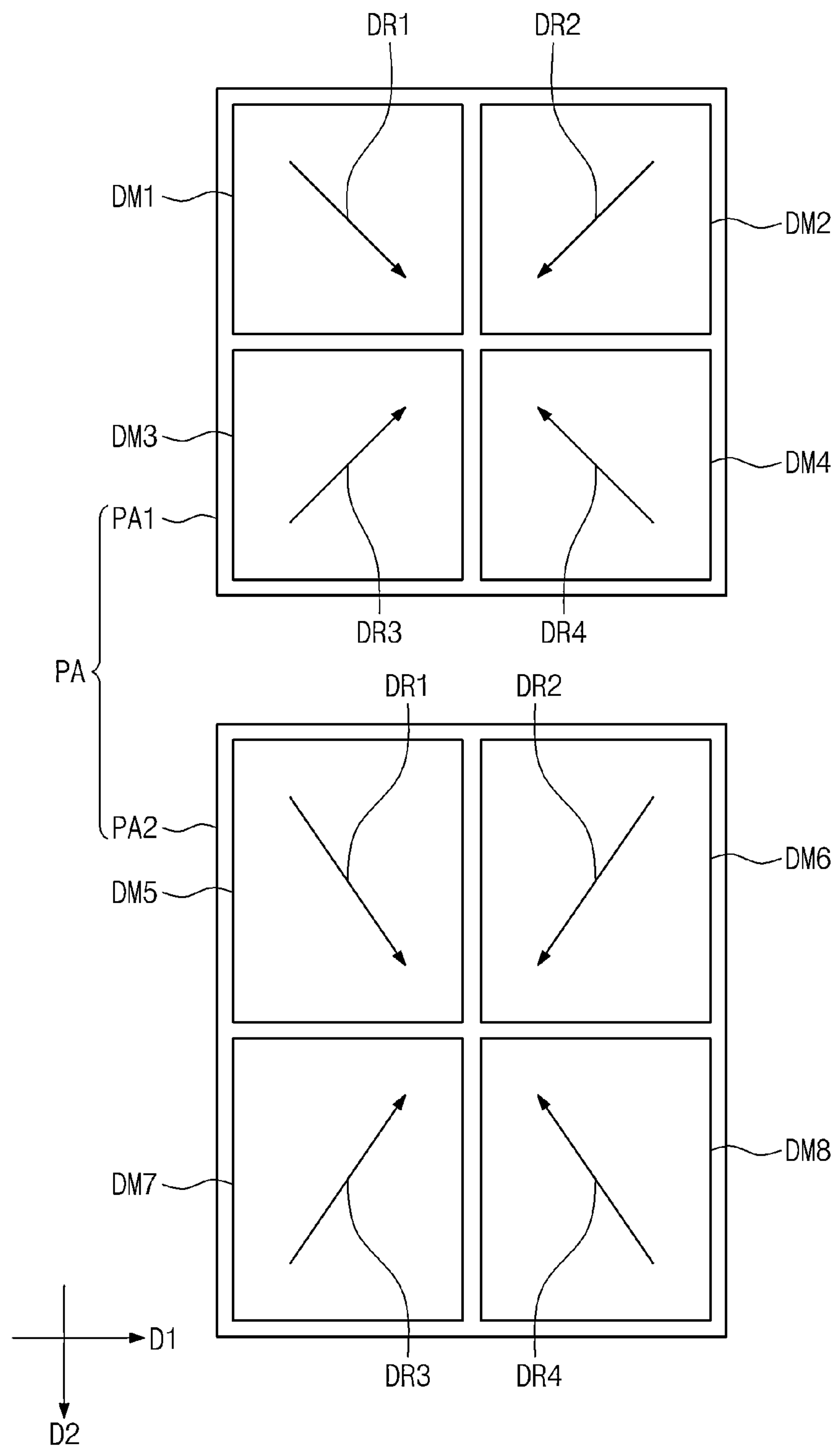
FIG. 3A is a view of domains defined on the pixel illustrated in FIG. 2.
Figure 3B:
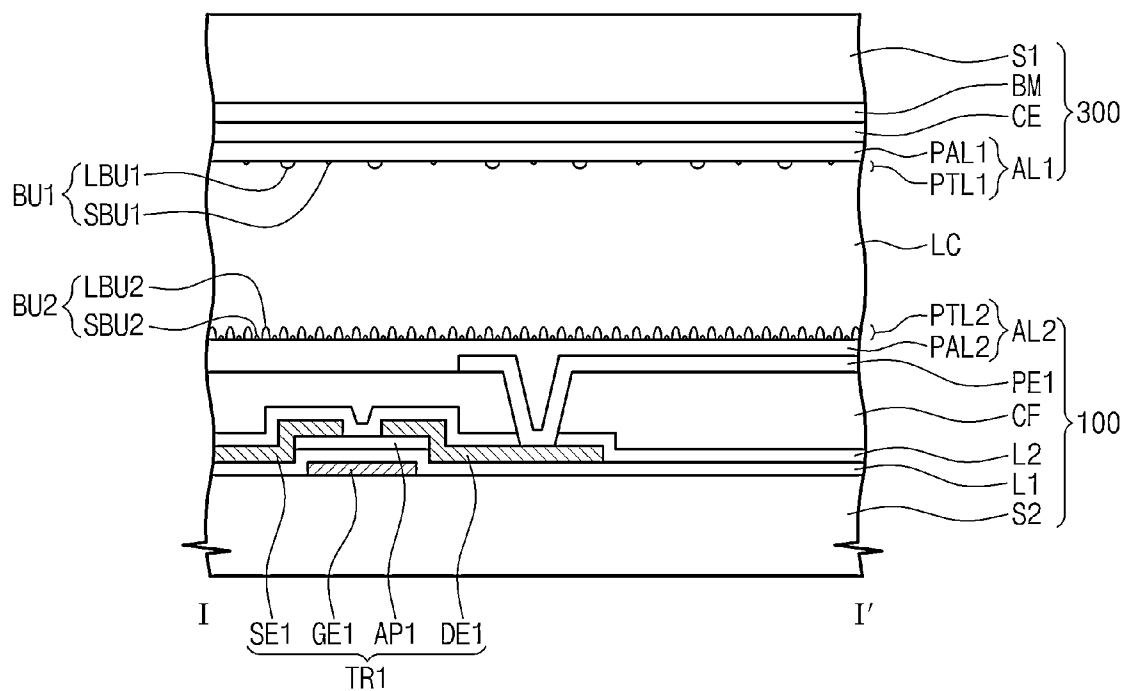
FIG. 3B is a cross-sectional view taken along line I-I' of FIG. 2.

In an exemplary embodiment, the curved display device 500 may include a display substrate 100, an opposite substrate 300, and a liquid crystal layer (e.g., LC of FIG. 3B). The opposite substrate 300 is disposed opposite to the display substrate 100 and coupled to the display substrate 100. The liquid crystal layer is disposed between the display substrate 100 and the opposite substrate 300.

In such an embodiment, the curved display device 500 may further include other components in addition to the display substrate 100 and the opposite substrate 300, but not being limited to the components. In one exemplary embodiment, for example, the curved display device 500 may further include a backlight assembly (not shown) that emits light toward the display substrate 100 and the opposite substrate 300, but not being limited thereto.

In an exemplary embodiment, as shown in FIGS. 1A to 1C, the curved display device 500 may be curved in a predetermined direction, e.g., a first direction D1, on a plane, e.g., a plane defined by a non-curved sides of the curved display device 500 as shown in FIG. 1B. Thus, a portion or the whole of the display substrate 100 may have a shape that is curved in the first direction D1, and the display area DA may have a curved shape that is curved in the first direction D1. In such an embodiment, as shown in FIG. 1C, the display substrate 100 may have a first curvature radius R1. In such an embodiment, the opposite substrate 300 may have a curved shape, along with the display substrate 100. In such an embodiment, the opposite substrate 300 may have a second curvature radius R2 as shown in FIG. 1C. As described above, in an exemplary embodiment, where the display substrate 100 and the opposite substrate 300 are firmly coupled to each other, stress may be locally concentrated into the display substrate 100 and the opposite substrate 300 when the display substrate 100 and the opposite substrate 300 are curved in the first direction D1. In such an embodiment, an area in which a cell gap between the display substrate 100 and the opposite substrate 300 is non-uniform may occur on the display area DA to cause miss-alignment between the display substrate 100 and the opposite substrate 300. That is, even though the display substrate 100 is precisely aligned with the opposite substrate 300 before the display substrate 100 and the opposite substrate are curved, the miss-alignment may occur after the display substrate 100 and the opposite substrate 300 are curved.

Figure 4A:
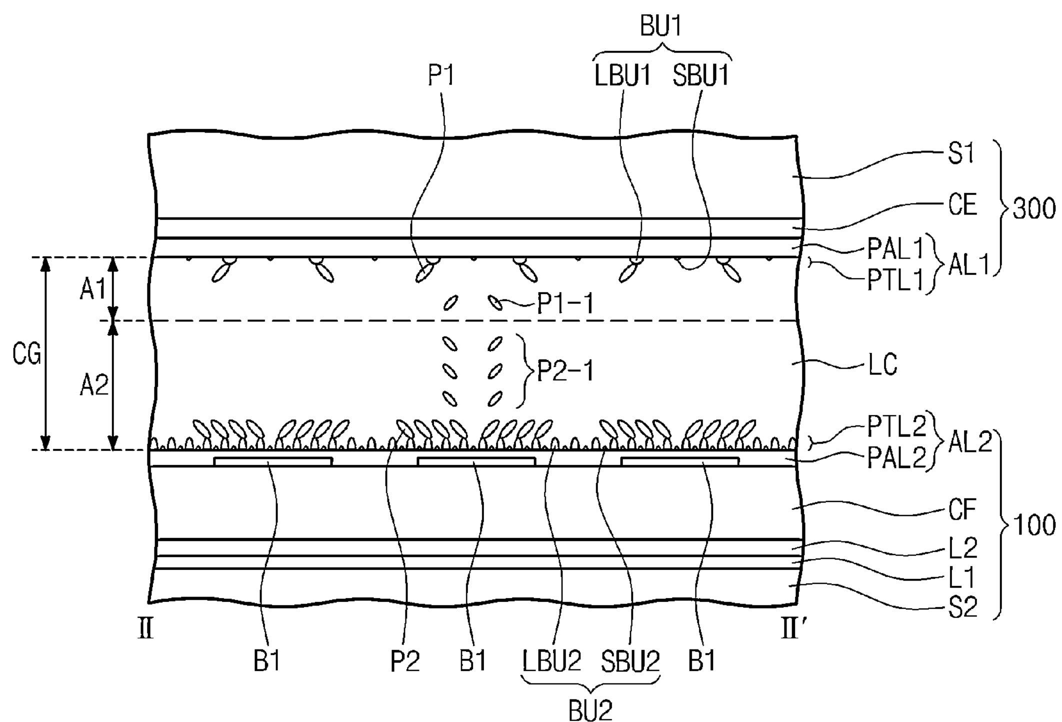
FIG. 4A is a cross-sectional view taken along line II-II' of FIG. 2.

As illustrated in FIG. 4A, when the miss-alignment occurs, a pretilt direction of a first pretilt liquid crystal P1 that is pretilted by a first alignment layer AL1 may be different from that of a second pretilt liquid crystal P2 that is pretilted by a second alignment layer AL2. If the pretilt direction of the first pretilt liquid crystals is different from that of the second pretilt liquid crystals overlapping the first pretilt liquid crystals, a rotation direction of the liquid crystal molecules may not be effectively defined by electric fields that are applied to the liquid crystal layer. Thus, a factor that deteriorates display quality such as a dark area may occur on the display area DA. In an exemplary embodiment, the curved display device 500 has a structure which effectively prevents the display quality from being deteriorated due to the above-described reasons.

Figure 2:
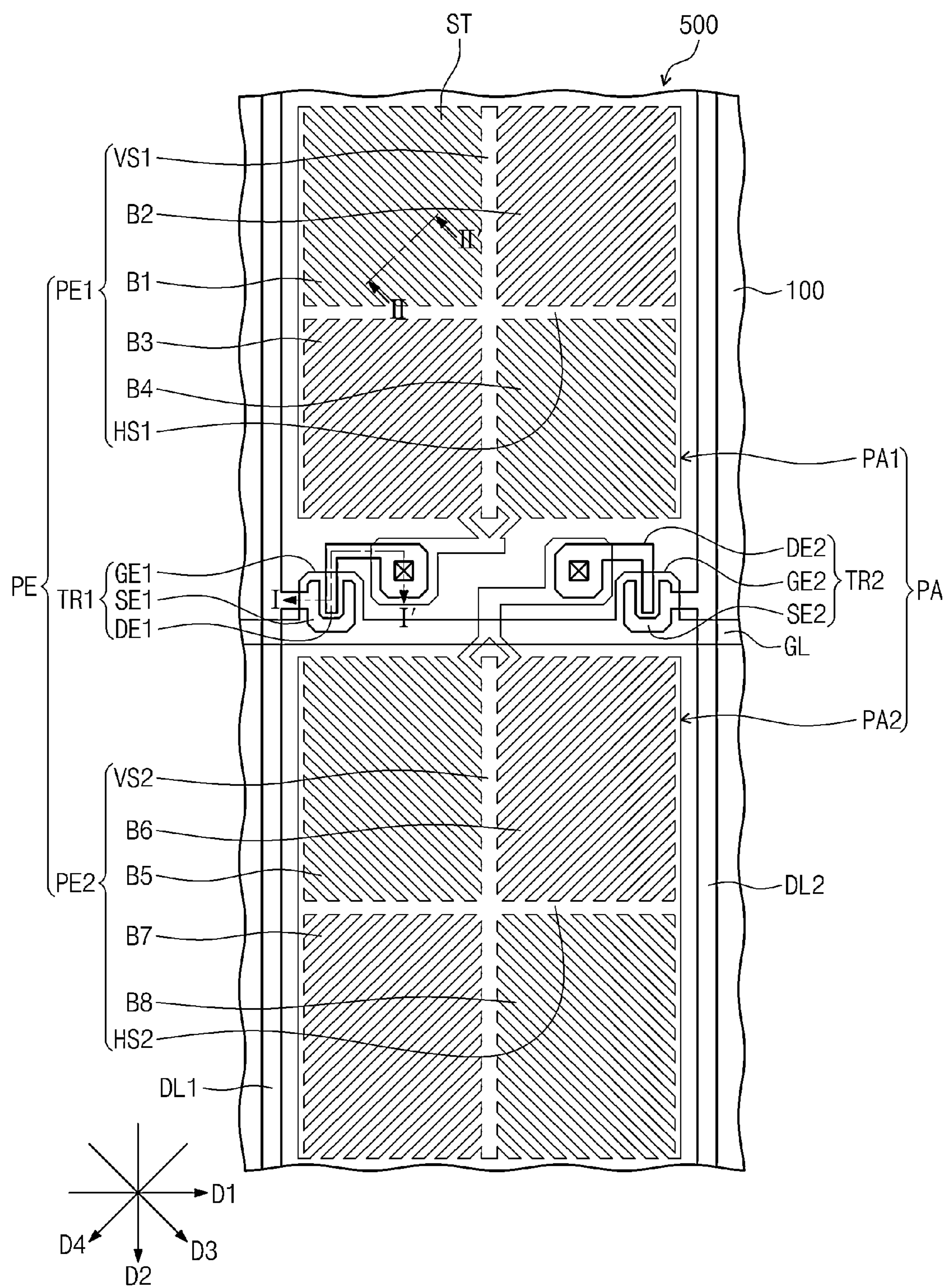
FIG. 2 is a plan view of an exemplary embodiment of a pixel of the curved display device illustrated in FIG. 1A.

FIG. 2 is a plan view of an exemplary embodiment of a pixel of the curved display device illustrated in FIG. 1A, FIG. 3A is a view of domains defined on the pixel illustrated in FIG. 2, and FIG. 3B is a cross-sectional view taken along line I-I' of FIG. 2.

In an exemplary embodiment, the curved display device 500 includes a plurality of pixels. A pixel area PA, in which one pixel of the pixels is disposed, is illustrated in FIG. 2. In such an embodiment, structure of the pixels are substantially the same as each other, the structure of the one pixel will be described in detail for convenience of description.

Referring to FIGS. 2, 3A, and 3B, an exemplary embodiment of the curved display device 500 includes the display substrate 100, the opposite substrate 300, and the liquid crystal layer LC disposed between the display substrate 100 and the opposite substrate 300.

The opposite substrate 300 includes a first base substrate S1, a light blocking layer BM, a common electrode CE, and the first alignment layer AL1. In an exemplary embodiment, the first base substrate S1 may be a transparent substrate, e.g., a glass substrate, having a light transmission property.

In an exemplary embodiment, the common electrode CE is disposed on the first base substrate S1 to generate electric fields in the light crystal layer LC together with a pixel electrode PE. The light blocking layer BM blocks light. In such an embodiment, the light blocking layer BM extends along an area defined between a first sub pixel area PA1 and a second sub pixel area PA2. The light blocking layer BM may extend along areas between domains adjacent to each other of first to eight domains DM1 to DM8.

In an exemplary embodiment, the light blocking layer BM is disposed on the first base substrate S1 as described above, but the invention is not limited thereto. In one alternative exemplary embodiment, for example, the light blocking layer BM may be disposed on a second base substrate S2 of the display substrate 100.

In an exemplary embodiment, the first alignment layer AL1 may include a reactive mesogen RM. In such an embodiment, the first alignment layer AL1 includes a first base layer PAL1 and a first alignment formation layer PTL1 disposed on the first base layer PAL1. A material of the first base layer PAL1 is not limited to a specific material thereof. In one exemplary embodiment, for example, the first base layer PAL1 may include or be formed of polymers such as polyimide, poly(amic acid), polyamide, poly(amic imide), polyester, polyethylene, polyurethane or polystyrene, mixture of the polymers, or a monomer of the polymers, but not being limited thereto. In an exemplary embodiment, the first base layer PAL1 may include a material well known in the art as a base layer of an alignment layer.

In an alternative exemplary embodiment, the first alignment formation layer PTL1 may not include the reactive mesogens RM that are polymerized with each other. In another alternative exemplary embodiment, the first alignment formation layer PTL1 includes a small amount of reactive mesogens RM that are polymerized with each other when compared to that of a second alignment formation layer PTL2. Also, the first alignment formation layer PTL1 may include a very small amount of reactive mesogens RM as an absolute amount. The term "reactive mesogen" may mean rephotocurable particles, i.e., a photo cross-linkable low-molecule or high-molecule copolymer. When light having a specific wavelength, for example, ultraviolet rays, are applied, chemical reaction such as polymerization reaction may occur in the reactive mesogen. The reactive mesogens RM are not specifically limited, but may be a reactive mesogen well known in the art. In one exemplary embodiment, for example, the reaction mesogens RM may include at least one of acrylate, methacrylate, epoxy, oxetane, vinyl ether, styrene, and derivatives thereof, but not being limited thereto.

The first alignment formation layer PTL1 may not include substantial amount of the reactive mesogens RM as the described the above, thus the first alignment formation layer PTL1 may not substantially pretilt the liquid crystal molecules adjacent to the first alignment layer AL1 to have a predetermined pretilt angle with respect to a surface of the first base substrate S1. Thus, in such an embodiment, the liquid crystal molecules adjacent to the first base layer PAL1 may not have specific directivity and be randomly disposed on the first alignment layer AL1 In such an embodiment, when electrical fields are applied to the liquid crystal layer LC, the liquid crystal molecules adjacent to the first alignment layer AL1 may be arranged on the first alignment layer AL1 in a direction perpendicular to the first alignment layer AL1.

The small amount of reactive mesogens that are polymerized with each other may form first protrusions BU1. The first protrusions BU1 may include first small-size protrusions SBU1 and first large-size protrusions LBU1.

Each of the first protrusions BU1 may have a particle size of, for example, about 1 nanometer (nm) or more. The first protrusions BU1 may have a mean particle diameter of about 1 nm or more. Here, a representative value of the particle size may be above about 1 nm.

The first small-size protrusions SBU1 and the first large-size protrusions LBU1 may be defined or classified based on a particle diameter of about 30 nm. In one exemplary embodiment, for example, each of the first small-size protrusions SBU1 may have a particle diameter of about 1 nm to about 30 nm Regarding the particle diameter, each of the first small-size protrusions SBU1 may have a particle diameter of about 1 nm to about 30 nm, and the first small-size protrusions SBU1 may have a mean particle diameter of about 1 nm to about 30 nm Here, a representative value of the first small-size protrusions SBU1 may be in a range from about 1 nm to about 30 nm.

In such an embodiment, each of the first large-size protrusions LBU1 may have a particle size of about 30 nm or more. Each of the first large-size protrusions LBU1 may have a particle size of about 30 nm to about 1,000 nm Regarding the particle diameter, each of the first large-size protrusions LBU1 may have a particle diameter of about 30 nm to about 1,000 nm, and the first large-size protrusions LBU1 may have a mean particle diameter of about 30 nm to about 1,000 nm. Here, a representative value of the first large-size protrusions LBU1 may be in a range from about 30 nm to about 1,000 nm.

The first small-size protrusions SBU1 and the first large-size protrusions LBU1 may be defined or classified based on a particle diameter of about 50 nm. In one exemplary embodiment, for example, each of the first small-size protrusions SBU1 may have a particle diameter of about 1 nm to about 50 nm Regarding the particle diameter, each of the first small-size protrusions SBU1 may have a particle diameter of about 1 nm to about 50 nm, and the first small-size protrusions SBU1 may have a mean particle diameter of about 1 nm to about 50 nm Here, a representative value of the first small-size protrusions SBU1 may range from about 1 nm to about 50 nm.

In such an embodiment, each of the first large-size protrusions LBU1 may have a particle size of about 50 nm or more. Each of the first large-size protrusions LBU1 may have a particle size of about 50 nm to about 1,000 nm Regarding the particle diameter, each of the first large-size protrusions LBU1 may have a particle diameter of about 50 nm to about 1,000 nm, and the first large-size protrusions LBU1 may have a mean particle diameter of about 50 nm to about 1,000 nm. Here, a representative value of the first large-size protrusions LBU1 may range from about 50 nm to about 1,000 nm.

The first base layer PAL1 and the first protrusions BU1 will be described later in greater detail.

The first alignment layer AL1 will be described later in greater detail with reference to FIGS. 4A to 4C.

In an exemplary embodiment, the display substrate 100 includes a second base substrate S2, a gate ling GL, a first data line DL1, a second data line DL2, a first thin film transistor TR1, a second thin film transistor TR2, a pixel electrode PE, a color filter CF and a second alignment layer AL2.

In such an embodiment, the second base substrate S2 may be a transparent substrate, e.g., a glass substrate, having a light transmission property. The gate line GL is disposed on the second base substrate S2, and gate line GL is electrically connected to the first and second thin film transistors TR1 and TR2 to transmit a gate signal to the first and second thin film transistors TR1 and TR2.

In an exemplary embodiment, the pixel area PA may include a first sub pixel area PA and a second sub pixel area PA2. In such an embodiment, the pixel electrode PE may include a first sub pixel electrode PE1 disposed in the first sub pixel area PA1 and a second sub pixel electrode PE2 disposed in the second sub pixel area PA2.

The first and second data lines DL1 and DL2 are insulated from the gate line GL and disposed on the second base substrate S2. The first data line DL1 transmits a first data signal, and the second data line DL2 transmits a second data signal. In such an embodiment, the first data line DL1 extends along a side of the first and second sub pixel electrodes PE1 and PE2, and the second data line DL2 extends along another side (e.g., opposite side) of the first and second sub pixel electrodes PE1 and PE2.

The first thin film transistor TR1 is electrically connected to the gate line GL, the first data line DL1 and the first sub pixel electrode PE1. The first thin film transistor TFT1 includes a first gate electrode GE1, a first active pattern AP1, a first source electrode SE1, and a first drain electrode DE1. The first gate electrode GE1 may be branched from the gate line GL, and the first active pattern AP1 may be disposed on the first gate electrode GE1 with a first insulation layer L1 therebetween. The first source electrode SE1 is branched from the first data line DL1 to contact the first active pattern APE and the first drain electrode DE1 is spaced apart from the first source electrode SE1 to contact the first active pattern AP1.

A second insulation layer L2 is disposed on, e.g., covers, the first and second thin film transistors TR1 and TR2. The color filter CF is disposed on the second insulation layer L2 to filter light incident into the display substrate 100 through the second base substrate S2, thereby generating color light.

The second thin film transistor TR2 is electrically connected to the gate line GL, the second data line DL2, and the second sub pixel electrode PE2. The second thin film transistor TFT2 includes a second gate electrode GE2, a second active pattern AP2, a second source electrode SE2, and a second drain electrode DE2. In such an embodiment, the second thin film transistor TR2 has a structure similar to that of the first thin film transistor TR1, and any repetitive detailed descriptions of the second thin film transistor TR2 will be omitted.

In such an embodiment, the first and second thin film transistors TR1 and TR2 may be turned on by the gate signal to provide the first data signal to the first sub pixel electrode PE1 through the first thin film transistor TR1 and provide the second data signal, which is different from the first data signal, to the second sub pixel electrode PE2 through the second thin film transistor TR2. Thus, the first and second sub pixel electrodes PE1 and PE2 are driven by the data signals different from each other to display gray scales different from each other on the first and second sub pixel areas PA1 and PA2.

In such an embodiment, the first sub pixel electrode PE1 includes a first horizontal stem part HS1, a first vertical stem part VS1, and first to fourth branch parts B1, B2, B3 and B4. The first horizontal stem part HS1 extends in the first direction D1 to cross the first sub pixel area PA1. The first vertical stem part VS1 extends in a second direction D2 to cross the first sub pixel area PA1, and the first vertical stem part VS1 is connected to the first horizontal stem part HS1. In such an embodiment, the first direction D1 may cross the second direction D2. In one exemplary embodiment, for example, the first direction D1 may be substantially perpendicular to the second direction D2.

The first branch parts B1 are branched from the first horizontal stem part HS1 or the first vertical stem part VS1. The first horizontal branch parts B1 are spaced apart from each other. Thus, a slit ST may be defined between two first branch parts B1 adjacent to each other of the first branch parts B1. In such an embodiment, each of the first branch parts B1 may extend in a third direction D3 that is inclined with respect to the first and second directions D1 and D2 on a plane. In such an embodiment, an acute angle defined by the third direction D2 and each of the first and second directions D1 and D2 may be in a range from about 40 degrees to about 50 degrees on a plane.

The second branch parts B2 are branched from the first horizontal stem part HS1 or the first vertical stem part VS1. In such an embodiment, each of the second branch parts B2 may extend in a fourth direction D4 that is inclined with respect to the first and second directions D1 and D2 on a plane. In such an embodiment, the fourth direction D4 may cross the third direction D3 on a plane, and an acute angle defined by the fourth direction D4 and each of the first and second directions D1 and D2 may be in a range from about 40 degrees to about 50 degrees on a plane.

The third branch parts B3 are branched from the first horizontal stem part HS1 or the first vertical stem part VS1. The fourth branch parts D4 are branched from the first horizontal stem part HS1 or the first vertical stem part VS1. In such an embodiment, each of the third branch parts B3 extend in the fourth direction D4 on a plane, and the fourth branch parts B4 may extend in the third direction D3 on a plane.

The second sub pixel electrode PE2 includes a second horizontal stem part HS2, a second vertical stem part VS2, and fifth to eighth branch parts B5, B6, B7, and B8. In such an embodiment, the second sub pixel electrode PE2 may have a size greater than that of the first sub pixel electrode PE1. In such an embodiment, the second sub pixel electrode PE2 has a structure similar to that of the first sub pixel electrode PE1, and any repetitive detailed descriptions of the structure of the second sub pixel electrode PE2 will be omitted.

In an exemplary embodiment, where the first to eighth branch parts B1 to B8 have the above-described structure, the first to fourth domains DM1, DM2, DM3 and DM4 may be defined on the first sub pixel area PA1, and fifth to eighth domains DM5, DM6, DM7 and DM8 may be defined on the second sub pixel area PA2.

In such an embodiment, the first to eighth domains DM1 to DM8 may be defined to one-to-one correspond to the areas on which the first to eighth branch parts B1 to B8 are disposed. When electric fields are generated between the pixel electrode PE and the common electrode CE, the liquid crystal molecules of the liquid crystal layer LC are aligned in a first liquid crystal alignment direction DR1 on the first domain DM. In such an embodiment, the liquid crystal molecules are aligned to one-to-one correspond to second to fourth liquid crystal alignment directions DR2, DR3, and DR4 on the second to fourth domains DM2, DM3 and DM4 in response to the electric fields. Here, the first to fourth liquid crystal alignment directions DR1, DR2, DR3 and DR4 may be different from each other.

Like the directions in which the liquid crystal molecules are aligned on the first to fourth domains DM1 to DM4, the liquid crystal molecules are aligned to one-to-one correspond to the first to fourth liquid crystal alignment directions DR1, DR2, DR3 and DR4 on the fifth to eighth domains DM5 to DM8.

In such an embodiment, the first and second domains DM1 and DM2 are arranged (e.g., disposed adjacent to each other) in the first direction DE the third and fourth domains DM3 and DM4 are arranged in the first direction DE the first and third domains DM1 and DM3 are arranged in the second direction D2, and the second and fourth domains DM2 and DM4 are arranged in the second direction D2.

The second alignment layer AL2 aligns the liquid crystal molecules of the liquid crystal layer LC. In an exemplary embodiment, the second alignment layer AL2 may include a material for fixing the liquid crystal molecules adjacent to the second alignment layer AL2 of the liquid crystal molecules to the second alignment layer AL2. In such an embodiment, the second alignment layer AL2 may include reactive mesogens RM that are coupled to the liquid crystal molecules to pretilt the liquid crystal molecules.

In an exemplary embodiment, the second alignment layer AL2 includes a second base layer PAL2 and a second alignment formation layer PTL2 disposed on the second base layer PAL2. The second base layer PAL2 is not limited to a specific material, but may include any well-known material for forming the base substrate. In one exemplary embodiment, for example, the second base layer PAL2 may include or be formed of polymers such as polyimide, poly (amic acid), polyamide, poly(amic imide), polyester, polyethylene, polyurethane, or polystyrene, mixture of the polymers or a monomer of the polymers, but not being limited thereto.

The second alignment formation layer PTL2 includes reactive mesogens RM that are polymerized with each other. The second alignment formation layer PTL2 may allow the liquid crystal molecules adjacent to the second alignment layer ALN2 to substantially pretilt. In an exemplary embodiment, an amount of polymerized reactive mesogens RM in the second alignment formation layer PTL2 may greater than an amount of polymerized reactive mesogens RM in the first alignment formation layer PTL1. Thus, the second alignment formation layer PTL2 may pretilt the liquid crystal molecules adjacent to the second base layer PAL2 such that the liquid crystal molecules are substantially tilted at a predetermined angle with respect to a surface of the second base substrate S2.

The reactive mesogens RM are not specifically limited a specific material, but may be a reactive mesogen well known in the art or widely used in the art. In one exemplary embodiment, for example, the reaction mesogens RM may include at least one of acrylate, methacrylate, epoxy, oxetane, vinyl ether, styrene, and derivatives thereof, but not being limited thereto.

In an exemplary embodiment, as shown in FIG. 4A, the reactive mesogens may define second protrusions BU2 of the second alignment formation layer PTL2. The second protrusions BU2 may include second small-size protrusions SBU2 and second large-size protrusions LBU2.

Each of the second protrusions BU2 may have a particle size of, for example, about 1 nm or more. The second protrusions BU2 may have a mean particle diameter of about 1 nm or more. In an exemplary embodiment, a representative value of the second protrusions BU2 may be above about 1 nm.

The second small-size protrusions SBU2 and the second large-size protrusions LBU2 may be defined or classified based on a particle diameter of about 30 nm. In one exemplary embodiment, for example, each of the second small-size protrusions SBU2 may have a particle diameter of about 1 nm to about 30 nm Regarding the particle diameter, each of the second small-size protrusions SBU2 may have a particle diameter of about 1 nm to about 30 nm, and the second small-size protrusions SBU2 may have a mean particle diameter of about 1 nm to about 30 nm. In such an embodiment, a representative value of the second small-size protrusions SBU2 may be in a range from about 1 nm to about 30 nm.

In such an embodiment, each of the second large-size protrusions LBU2 may have a particle size of about 30 nm or more. Each of the second large-size protrusions LBU2 may have a particle size of about 30 nm to about 1,000 nm Regarding the particle diameter, each of the second large-size protrusions LBU2 may have a particle diameter of about 30 nm to about 1,000 nm, and the second large-size protrusions LBU2 may have a mean particle diameter of about 30 nm to about 1,000 nm. In such an embodiment, a representative value of the second small-size protrusions SBU2 may in a range from about 30 nm to about 1,000 nm.

The second small-size protrusions SBU2 and the second large-size protrusions LBU2 may be defined or classified based on a particle diameter of about 50 nm. In one exemplary embodiment, for example, each of the second small-size protrusions SBU2 may have a particle diameter of about 1 nm to about 50 nm Regarding the particle diameter, each of the second small-size protrusions SBU2 may have a particle diameter of about 1 nm to about 50 nm, and the second small-size protrusions SBU2 may have a mean particle diameter of about 1 nm to about 50 nm. In such an embodiment, a representative value of the second small-size protrusions SBU2 may be in a range from about 1 nm to about 50 nm.

In such an embodiment, each of the second large-size protrusions LBU2 may have a particle size of about 50 nm or more. Each of the second large-size protrusions LBU2 may have a particle size of about 50 nm to about 1,000 nm Regarding the particle diameter, each of the second large-size protrusions LBU2 may have a particle diameter of about 50 nm to about 1,000 nm, and the second large-size protrusions LBU2 may have a mean particle diameter of about 50 nm to about 1,000 nm. In such an embodiment, a representative value of the second large-size protrusions LBU2 may be in a range from about 50 nm to about 1,000 nm.

Hereinafter, distribution of the first protrusions BU1 on the first base layer PAL1 and distribution of the second protrusions BU2 on the second base layer PAL2 will be described in greater detail.

In an exemplary embodiment, as described above, the small of reactive mesogens that are polymerized with each other may form the first protrusions BU1 on the first base layer PAL1. In such an embodiment, the first protrusions BU1 may include the first small-size protrusions SBU1 and the first large-size protrusions LBU1. In such an embodiment, the first base layer PAL1 may include a first overlapping area that overlaps the first large-size protrusions LBU1 and a first non-overlapping area that does not overlap the first large-size protrusions LBU1.

In such an embodiment, the reactive mesogens that are polymerized with each other may define the second protrusions BU2 on the second base layer PAL2. In such an embodiment, the second protrusions BU2 may include the second small-size protrusions SBU2 and the second large-size protrusions LBU2. In such an embodiment, the second base layer PAL2 may include a second overlapping area that overlaps the second large-size protrusions LBU2 and a second non-overlapping area that does not overlap the second large-size protrusions LBU2.

Figure 6A:
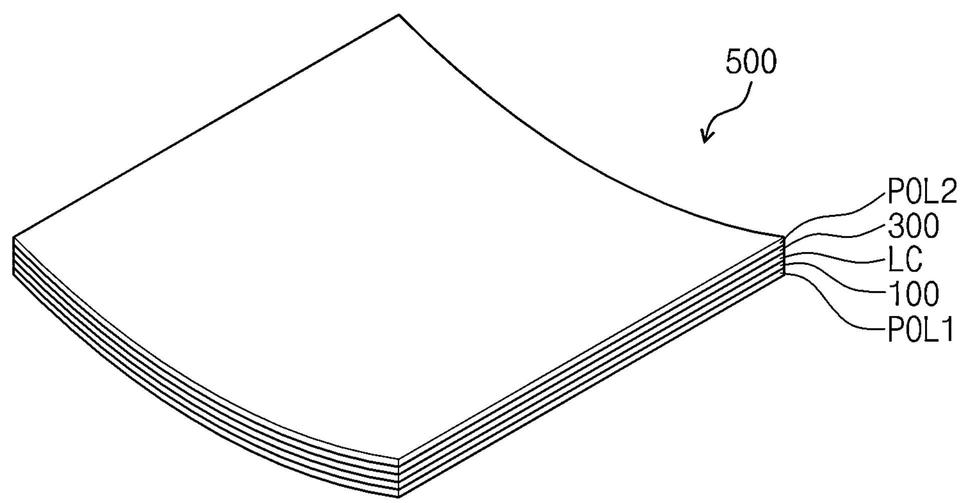
FIG. 6A is a schematic perspective view of an exemplary embodiment of the curved display device according to the invention.
Figure 6B:
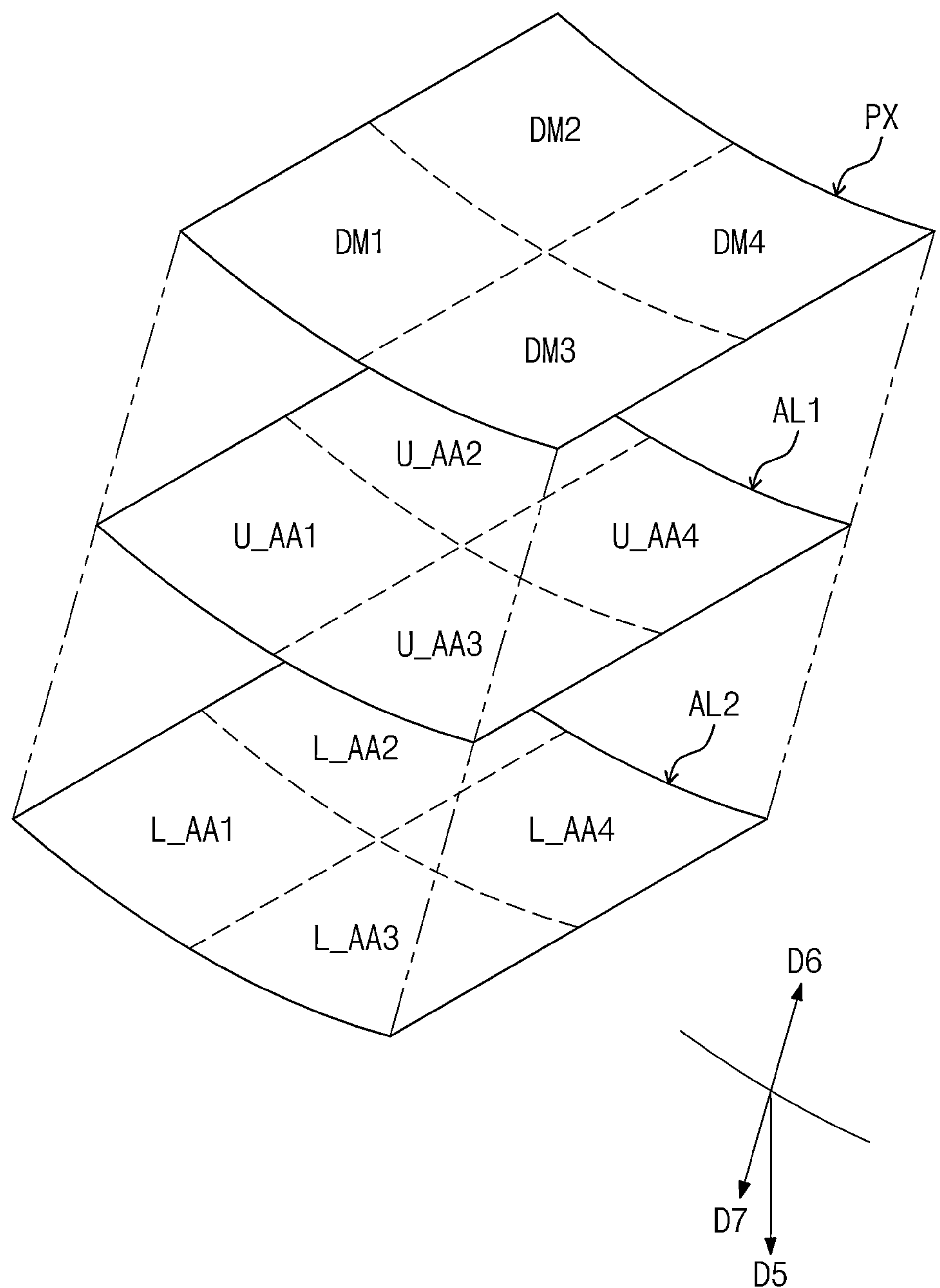
FIG. 6B is a schematic perspective view of the pixel and the first and second alignment layers corresponding to the pixel in an exemplary embodiment of the curved display device according to the invention.

In one exemplary embodiment, for example, the first overlapping area and the first non-overlapping area, and the second overlapping area and the second non-overlapping area may be divided by a boundary between the area on which the large-side protrusions are disposed and the area on which the large-size protrusions are not disposed, when viewed in a fifth direction (e.g., D5 of FIG. 6B).

In the following descriptions, the first overlapping area may have a surface area that corresponds to a mean value or reprehensive value of areas extracted from any unit area of the first base layer PAL1 as well as the entire surface area of the first overlapping area on the first base layer PAL1. The first non-overlapping area may have a surface area that corresponds to a mean value or reprehensive value of areas extracted from any unit area of the first base layer PAL1 as well as the entire surface area of the first non-overlapping area on the first base layer PAL1 The second overlapping area may have a surface area that corresponds to a mean value or reprehensive value of areas extracted from any unit area of the second base layer PAL2 as well as the entire surface area of the second overlapping area on the second base layer PAL2.

Hereinafter, an exemplary embodiment, in which each of the first and second large-size protrusions LBU1 and LBU2 has a particle diameter of about 30 nm to about 1,000 nm, will be described.

When the each of the first and second large-size protrusions LBU1 and LBU2 has a particle diameter of about 30 nm to about 1,000, the first and second overlapping areas in an exemplary embodiment of the curved display device 500 according to the invention may have a relationship that is expressed by the following Inequation 1.

$$0<\text{surface area of first overlapping area}/\text{surface area of second overlapping area}\leq 4/5 \quad \text{Inequation 1:}$$

When the surface area of first overlapping area/surface area of second overlapping area exceeds 4/5, the liquid crystal molecules adjacent to the first alignment layer AL1 may be tilted to generate a dark area on which light is not seen, as described below with reference to FIG. 7A to 7E.

The first overlapping area may have a surface area less than that of the first non-overlapping area. The first and second overlapping areas in an exemplary embodiment of the curved display device 500 according to the invention may have a relationship that is expressed as the following Inequation 2.

0<surface area of first overlapping area/surface area of first non-overlapping area<5/10  Inequation 2:

When the surface area of first overlapping area/surface area of first non-overlapping area is equal to or greater than 5/10, the liquid crystal molecules adjacent to the first alignment layer AL1 may be tilted to generate a dark area on which light is not seen, as described below with reference to FIG. 7A to 7E.

The first overlapping area may have a surface area that is greater than 0 $nm^2$ and equal to or less than $3.5\times10^5$ $nm^2$ in a unit area ($1.0\times10^6$ $nm^2$) of a surface of the first base layer PAL1 that is, in a unit area of $1.0\times10^6$ $nm^2$ defined on the first base layer PAL1 When the first overlapping area has a surface area that is greater than $3.5\times10^5$ $nm^2$ in the unit area ($1.0\times10^6$ $nm^2$) of the surface of the first base layer PAL1 the liquid crystal molecules adjacent to the first alignment layer AL1 may be tilted to generate a dark area on which light is not seen, as described below with reference to FIG. 7A to 7E.

The second overlapping area may have a surface area that is equal to or greater than $3.0\times10^5$ $nm^2$ and equal to or less than $1.0\times10^6$ $nm^2$ in a unit area ($1.0\times10^6$ $nm^2$) of a surface of the second base layer PAL2. When the second overlapping area has a surface area that is less than $3.0\times10^5$ $nm^2$ in the unit area ($1.0\times10^6$ $nm^2$) of the surface of the second base layer PAL2, the number of second large-size protrusions LBU2 may be too less to allow the liquid crystal molecules adjacent to the first alignment layer AL1 to be effectively tilted by the second alignment layer AL2.

The amount of the reactive mesogens in the second alignment layer AL2 may be greater than the amount of the reactive mesogens in the first alignment layer AL1. Thus, the number of the first large-size protrusions LBU1 may be less than the number of the second large-size protrusions LBU2.

Hereinafter, an exemplary embodiment in which each of the first and second large-size protrusions LBU1 and LBU2 has a particle diameter of about 50 nm to about 1,000 nm will be described.

When the each of the first and second large-size protrusions LBU1 and LBU2 has a particle diameter of about 50 nm to about 1,000, the first and second overlapping areas in an exemplary embodiment of the curved display device 500 according to the invention may have a relationship that is expressed by the following Inequation 3.

0<surface area of first overlapping area/surface area of second overlapping area≤1/2  Inequation 3:

When the surface area of first overlapping area/surface area of second overlapping area exceeds 1/2, the liquid crystal molecules adjacent to the first alignment layer AL1 may be tilted to generate a dark area on which light is not seen, as described below with reference to FIG. 7A to 7E.

The first overlapping area may have a surface area less than that of the first non-overlapping area. The first and second overlapping areas in an exemplary embodiment of the curved display device 500 according to the invention may have a relationship that is expressed by the following Inequation 4.

0<surface area of first overlapping area/surface area of first non-overlapping area≤1/10  Inequation 4:

When the surface area of first overlapping area/surface area of first non-overlapping area exceeds 1/10, the liquid crystal molecules adjacent to the first alignment layer AL1 may be tilted to generate a dark area on which light is not seen, as described below with reference to FIG. 7A to 7E.

The first overlapping area may have a surface area that is greater than 0 $nm^2$ and equal to or less than $0.3\times10^5$ $nm^2$ in the unit area ($1.0\times10^6$ $nm^2$) of the surface of the first base layer PAL1 When the first overlapping area has a surface area that is greater than $0.3\times10^5$ $nm^2$ in the unit area ($1.0\times10^6$ $nm^2$) of the surface of the first base layer PAL1, the liquid crystal molecules adjacent to the first alignment layer AL1 may be tilted to generate a dark area on which light is not seen, as described below with reference to FIG. 7A to 7E.

The second overlapping area may have a surface area that is equal to or greater than $0.4\times10^5$ $nm^2$ and equal to or less than $1.0\times10^6$ $nm^2$ in a unit area ($1.0\times10^6$ $nm^2$) of a surface of the second base layer PAL2. If the number of second large-size protrusions LBU2 is substantially low, the liquid crystal molecules adjacent to the first alignment layer AL1 may not be effectively tilted by the second alignment layer AL2.

In an exemplary embodiment, as described above, the liquid crystal molecules are aligned by the electric fields in the state where the liquid crystal molecules are pretilted by the first and second alignment layers AL1 and AL2, such that a response time of the curved display device 500 may be improved.

Figure 4B:
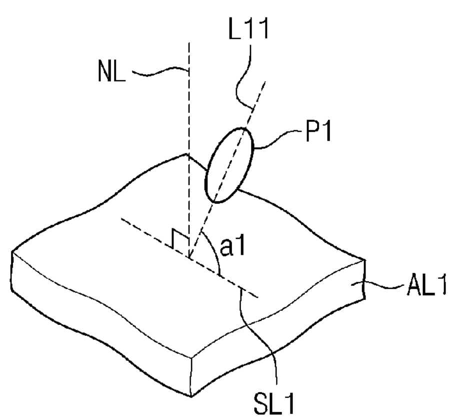
FIG. 4B is an enlarged view of a first pretilt liquid crystal illustrated in FIG. 4A.
Figure 4C:
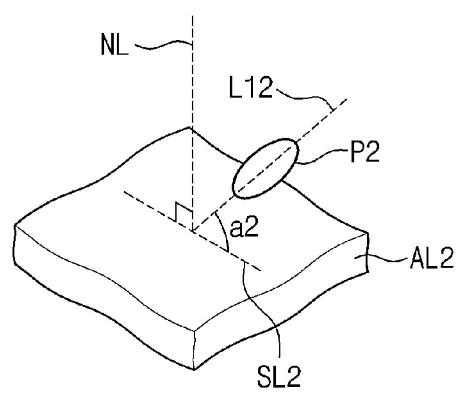
FIG. 4C is a view of a second pretilt liquid crystal illustrated in FIG. 4A.

FIG. 4A is a cross-sectional view taken along line II-II' of FIG. 2, FIG. 4B is an enlarged view of a first pretilt liquid crystal illustrated in FIG. 4A, and FIG. 4C is a view of a second pretilt liquid crystal illustrated in FIG. 4A.

Referring to FIGS. 4A, 4B and 4C, a cell gap CG is defined between the display substrate 100 and the opposite substrate 300. The liquid crystal layer LC including the liquid crystal molecules may be disposed between, e.g., filled into, the cell gap CG. When the liquid crystal molecules adjacent to the first alignment layer AL1 of the liquid crystal molecules are defined as first pretilt liquid crystals P1, and the liquid crystal molecules, which are pretilted by the second alignment layer AL2, of the liquid crystal molecules are defined as second pretilt liquid crystals P2, the first alignment layer AL1 may not substantially pretilt the first pretilt liquid crystals P1. The first pretilt liquid crystals P1 may have a first pretilt-angle a1 with respect to the first alignment layer AL1. The second alignment layer AL2 aligns the second pretilt liquid crystals P2 at a second pretilt-angle a2.

In such an embodiment, when a normal line NL of the first alignment layer AL1, a first straight line SL1 on the first alignment layer AL1 and a first long axis L11 of the first pretilt liquid crystals P1 are defined as illustrated in FIG. 4B, the first pretilt-angle a1 may be defined as an angle between the first long axis L11 and the first straight line SL1.

In such an embodiment, when a normal line NL of the second alignment layer AL2, a second straight line SL2 on the second alignment layer AL2 and a second long axis L12 of the second pretilt liquid crystals P2 are defined as illustrated in FIG. 4C, the second pretilt-angle a2 may be defined as an angle between the second long axis L12 and the second straight line SL2.

In one exemplary embodiment, for example, the second pretilt-angle a2 may be a value of each of the pretilt-angles of the liquid crystal molecules adjacent to the second alignment layer AL2, a mean value of the pretilt-angles of the liquid crystal molecules adjacent to the second alignment layer AL2, or a representative value of the pretilt-angles of the liquid crystal molecules adjacent to the second alignment layer AL2. The second pretilt-angle a2 may be in a range of about 80° to about 90°. The second pretilt-angle a2 may be in a range of about 80° to about 89°. The second pretilt-angle a2 may be greater 80° and less than 88° so that the second pretilt-angle a2 is different from the first pretilt-angle a1.

The first pretilt-angle a1 may be different from the second pretilt-angle a2 and greater than the second pretilt-angle a2. In one exemplary embodiment, for example, the first pretilt-angle a1 may be a value of each of the pretilt-angles of the liquid crystal molecules adjacent to the first alignment layer AL1, a mean value of the pretilt-angles of the liquid crystal molecules adjacent to the first alignment layer AL1, or a representative value of the pretilt-angles of the liquid crystal molecules adjacent to the first alignment layer ALL The first pretilt-angle a1 may range of about 88° to about 90°. The first pretilt-angle a1 may range of about 89° to about 90°. The first pretilt-angle a1 may be set to be greater than the second pretilt-angle a2 in the range of about 88° to about 90°. In an exemplary embodiment, where the second pretilt-angle a2 is set to be an angle of about 80°, 85°, 86° or 89°, the first pretilt-angle a1 may be set to be an angle of about 89.5° or about 90° that is greater than that of the second pretilt-angle a2.

In such an embodiment, the second pretilt-angle a2 may be less than the first pretilt-angle a1. In one exemplary embodiment, for example, the first pretilt-angle a1 may be about 89.8°, and the second pretilt-angle a2 may be about 88°. When the second pretilt-angle a2 is less than the first pretilt-angle a1, the tendency in which the liquid crystal molecules filled into the cell gap CG behave by the second pretilt liquid crystals P2 in response to the electric fields acting on the cell gap CG may be stronger than that in which the liquid crystal molecules behave by the first pretilt liquid crystals P1.

In an exemplary embodiment, when a first portion of the liquid crystal molecules that are aligned parallel to a direction of the first pretilt liquid crystals P1 in response to the electric fields is defined as first liquid crystal molecules P1-1, and a second portion of the liquid crystal molecules that are aligned parallel to a direction of the second pretilt liquid crystals P2 in response to the electric fields is defined as second liquid crystal molecules P2-1, an amount of second liquid crystal molecules P2-1 is greater than that of first liquid crystal molecules P1-1.

Thus, in an exemplary embodiment, where the cell gap CG is divided into a first space A1 and a second space A2, which are disposed in a direction perpendicular to the second base substrate S2, when the first space A1 is defined as a space in which the first liquid crystal molecules P1-1 are filled, and the second space A2 is defined as a space in which the second liquid crystal molecules P2-1 are filled, the second space A2 may be greater than the first space A1, e.g., the second space A2 have a thickness (or a width on a cross-section) greater than that of the first space A1.

The first alignment layer AL1 may not substantially include the first reactive mesogens, and the second alignment layer AL2 may substantially include the second reactive mesogens for fixing the liquid crystal molecules to the second alignment layer A12. Also, an amount of second reactive mesogens per unit area of the second alignment layer AL2 may be greater than that of first reactive mesogens per unit area of the first alignment layer AL1. Thus, if an amount of second reactive mesogens is greater than that of first reactive mesogens, an amount of second pretilt liquid crystals P2 fixed to the second alignment layer AL2 by the second reactive mesogens may be less than that of first pretilt liquid crystals P1. Accordingly, in an exemplary embodiment, the amount of second liquid crystal molecules P2-1 is greater than that of first liquid crystal molecules P1-1.

In an exemplary embodiment, an amount of second reactive mesogens respectively coupled or adjacent to the second pretilt liquid crystals P2 may be greater than that of first reactive mesogens respectively coupled or adjacent to the first pretilt liquid crystals P1. As a result, a force by which each of the second pretilt liquid crystals P2 is pulled toward a surface of the second alignment layer AL2 by the second reactive mesogens is greater than that by which each of the first pretilt liquid crystals P1 is pulled toward a surface of the first alignment layer AL1 by the first reactive mesogens. Thus, in such an embodiment, the second pretilt-angle a2 is greater than the first pretilt-angle a1.

As described above with reference to FIGS. 1A to 1C, as the curved display device is curved to have a curved shape, the miss-alignment between the display substrate 100 and the opposite substrate 300 may occur. When the miss-alignment occurs, a pretilt direction of the first pretilt liquid crystals P1 may be different from that of the second pretilt liquid crystals P2 that overlap the first pretilt liquid crystals P1. In an exemplary embodiment, where the amount of first pretilt liquid crystals P1 is less than that of second pretilt liquid crystals P2, an amount of liquid crystal molecules that are aligned in direction opposite to each other on the area on which the miss-alignment occurs may be reduced, such that an occurrence of a factor that deteriorates the display quality such as the dark area in the curved display device 50 may be reduced.

Figure 5A:
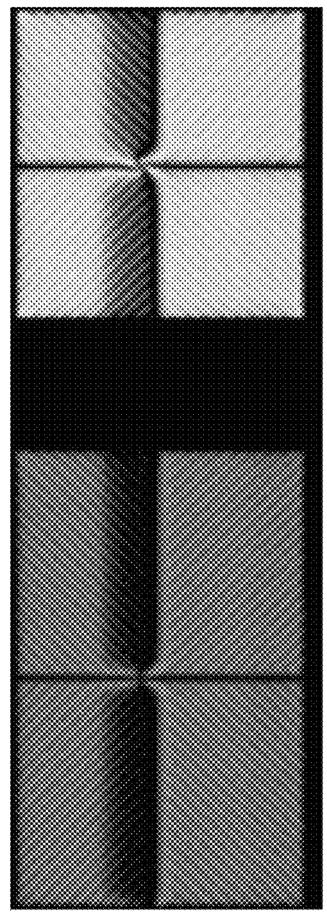
FIGS. 5A to 5D are photographs illustrating brightness of first to eight domains according to the first and second pretilt-angles.

FIGS. 5A to 5D are photographs illustrating brightness of first to eight domains according to the first and second pretilt-angles. FIG. 5A illustrates brightness of the domains when the first pretilt-angle (see reference symbol a1 of FIG. 4B) that is described with reference to FIG. 4B is about 89°, and the second pretilt-angle (see reference numeral a2 of FIG. 4B) that is described with reference to FIG. 4C is about 89°. In this case, a dark area having a band shape in the second direction (see reference numeral D2 of FIG. 3A) may occur on the domains to deteriorate the display quality of the curved display device.

Figure 5B:
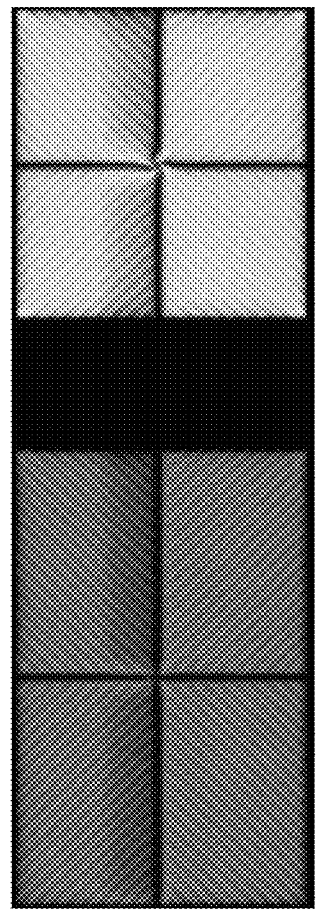

FIG. 5B illustrates brightness of the domains when the first pretilt-angle is about 89.5°, and the second pretilt-angle is about 88°. In this case, a dark area having a band shape may occur on the domains. Here, a visible degree (e.g., visible size) of the dark area of FIG. 5B may be less than that of the dark area of FIG. 5A.

Figure 5C:
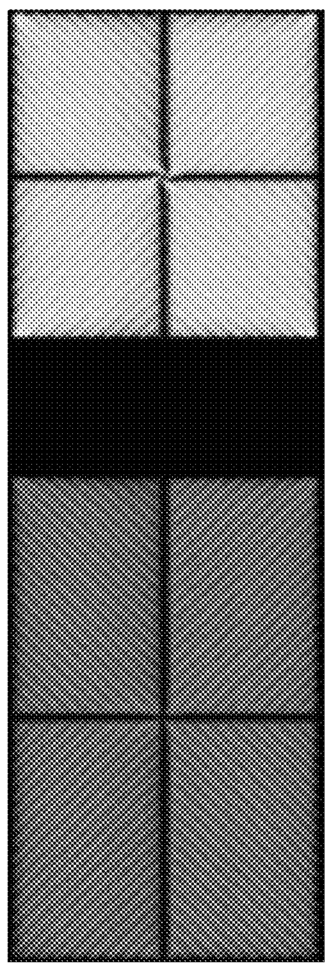

FIG. 5C illustrates brightness of the domains when the first pretilt-angle is about 89.8°, and the second pretilt-angle is about 89.0°. In this case, a dark area having a band shape does not substantially occur on the domains. That is, each of the domains may have substantially uniform brightness.

Figure 5D:
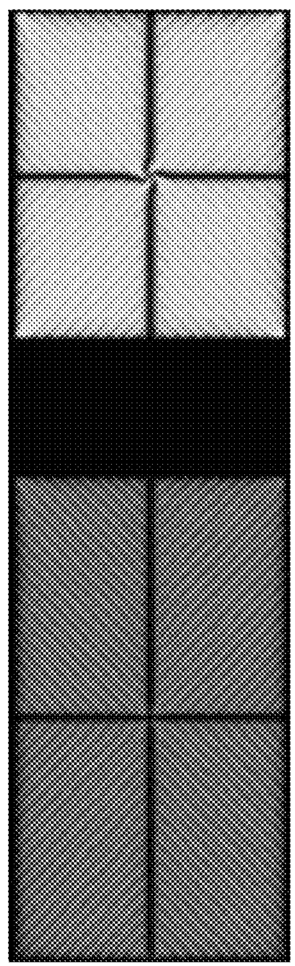

FIG. 5D illustrates brightness of the domains when the first pretilt-angle is about 90°, and the second pretilt-angle is about 89°. In this case, a dark area having a band shape does not substantially occur on the domains. That is, each of the domains may have substantially uniform brightness.

As shown in FIGS. 5A to 5D, a visible degree of the dark area on the domains may be less than that of the dark area when the second pretilt-angle is less than the first pretilt-angle. In an exemplary embodiment, where the second pretilt-angle is less than the first pretilt-angle, when a difference between the second pretilt-angle and the first pretilt-angle may be about 0.4° to about 1.2°, the visible degree of the dark area on the domains may be minimized to realize substantially uniform brightness on the domains.

In such an embodiment, where the difference between the second pretilt-angle and the first pretilt-angle is in the range of about 0.4° to about 1.2°, when the first pretilt-angle is about 89.6° to about 90.0°, the visible degree of the dark area on the domains may be minimized to realize uniform brightness on the domains.

Figure 6C:
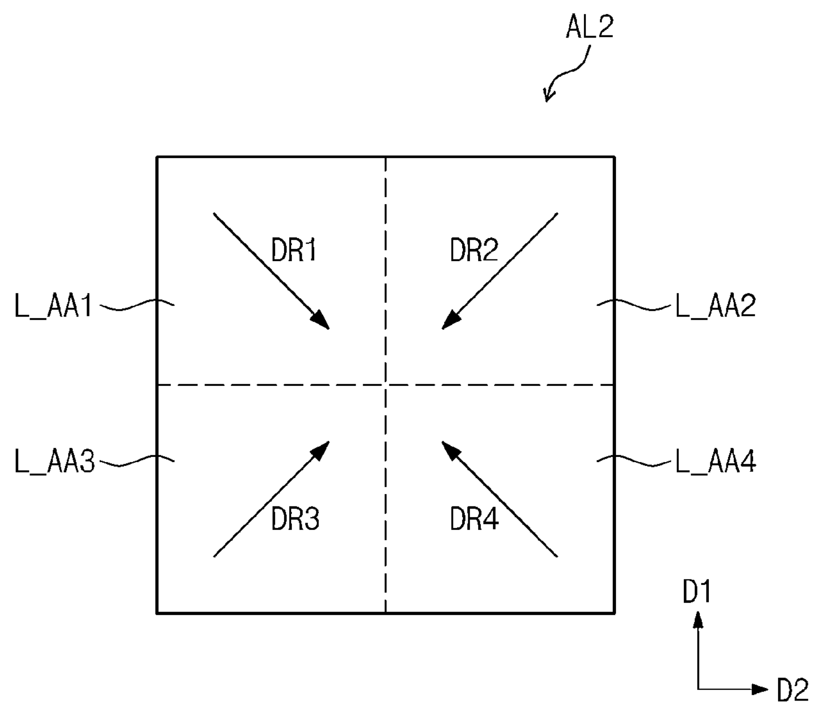
FIG. 6C is a schematic plan view of the first alignment layer shown in FIG. 6B.
Figure 6D:
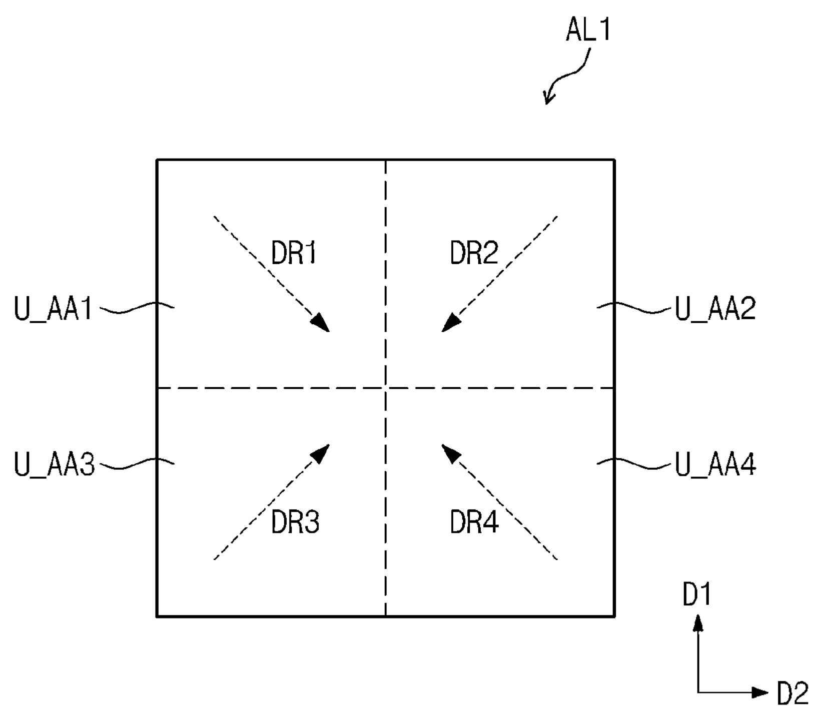
FIG. 6D is a schematic plan view of the second alignment layer shown in FIG. 6B.
Figure 6E:
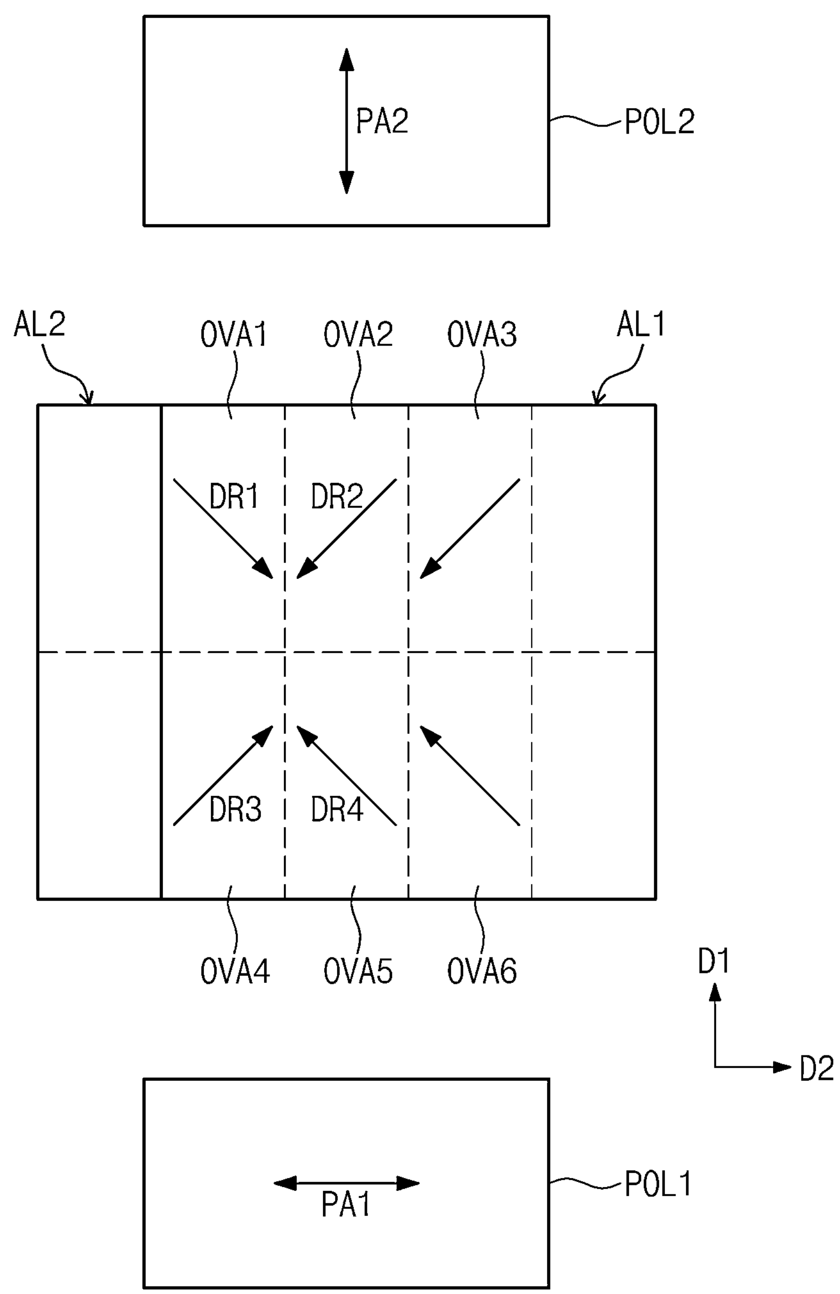
FIG. 6E is a schematic plan view of an overlapping area between the first and second alignment layers, a lower polarization plate, and an upper polarization plate in an exemplary embodiment of the curved display device according to the invention.
Figure 6F:
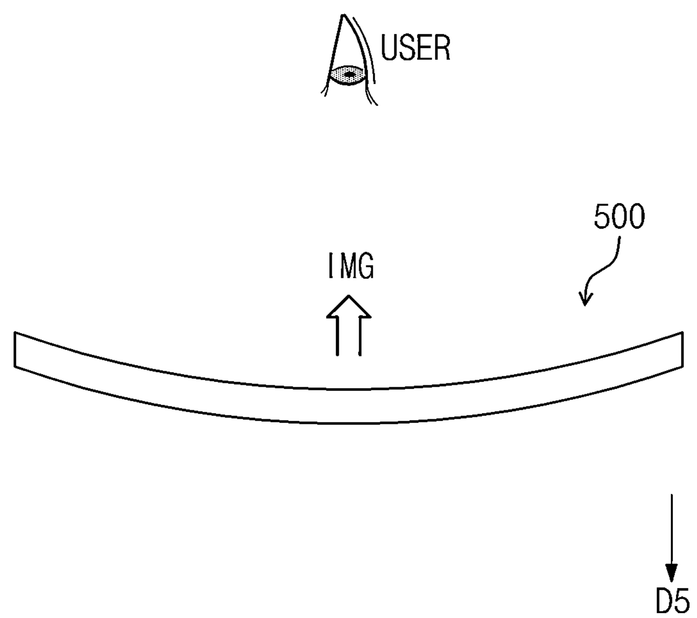
FIG. 6F is a schematic view illustrating a state in which a user recognizes an image displayed on an exemplary embodiment of the curved display device according the invention.

FIG. 6A is a schematic perspective view of an exemplary embodiment of the curved display device according to the invention. FIG. 6B is a schematic perspective view of the pixel and the first and second alignment layers corresponding to the pixel of an exemplary embodiment of the curved display device according to the invention. FIG. 6C is a schematic plan view of the first alignment layer shown in FIG. 6B. FIG. 6D is a schematic plan view of the second alignment layer shown in FIG. 6B. FIG. 6E is a schematic plan view of an overlapping area between the first and second alignment layers, a lower polarization plate and an upper polarization plate in an exemplary embodiment of the curved display device according to the invention. FIG. 6F is a schematic view illustrating a state in which a user recognizes an image displayed on an exemplary embodiment of the curved display device according to the invention.

Referring to FIGS. 4A and 6A to 6D, the second alignment layer AL2 includes lower alignment areas L_AA1, L_AA2, L_AA3 and L_AA4. The lower alignment areas L_AA1, L_AA2, L_AA3 and L_AA4 include a first lower alignment area L_AA1, a second lower alignment area L_AA2, a third lower alignment area L_AA3 and a fourth lower alignment area L_AA4. The lower alignment areas L_AA1, L_AA2, L_AA3 and L_AA4 may correspond to overlap the domains DM1, DM2, DM3 and DM4 in a fourth direction D4 that is a normal direction of the pixel PX and a seventh direction D7 that is opposite to the sixth direction D6.

The first domain DM1, the second domain DM2, the third domain DM3 and the fourth domain DM4 may one-to-one correspond to the first lower alignment area L_AA1, the second lower alignment area L_AA2, the third lower alignment area L_AA3 and the fourth lower alignment area L_AA4. The second pretilt liquid crystal molecules P2 may be pretilted by the second reactive mesogens that are polymerized with each other on each of the first to fourth lower alignment areas L_AA, L_AA2, L_AA3 and L_AA4. When the electrical fields are generated in the liquid crystal layer LC, the second pretilt liquid crystals P2 and the second pretilt liquid crystal molecules P2-1 may be quickly aligned in a parallel direction than the liquid crystal molecules that are not pretilted. That is, the liquid crystal molecules may be quickly rearranged from a vertically aligned state to a parallelly aligned state.

When the electrical fields are applied to the liquid crystal layer LC, the second pretilt first liquid crystals P2 and the second liquid crystal molecules P2-1 may be aligned in a direction parallel to an extension direction of the first branch parts (B1 of FIG. 2) on the first lower alignment area L_AA1. Here, the extension direction of the first branch parts may be substantially parallel to the first liquid crystal alignment direction DR1. The first liquid crystal alignment direction DR1 may represent a mean direction of parallelly aligned directions when the second pretilt liquid crystals P2 and the second liquid crystal molecules P2-1 are parallelly aligned on the first lower alignment area L_AA1.

Similarly, when the electric fields are applied to the liquid crystal layer LC, the second pretilt liquid crystals P2 and the second liquid crystal molecules P2-1 are aligned in a second liquid crystal alignment direction DR2 on the second lower alignment area L_AA2, the second pretilt liquid crystals P2 and the second liquid crystal molecules P2-1 are aligned in a third liquid crystal alignment direction DR3 on the third lower alignment area L_AA3, and the second pretilt liquid crystals P2 and the second liquid crystal molecules P2-1 are aligned in a fourth liquid crystal alignment direction DR4 on the fourth lower alignment area L_AA4. The second liquid crystal alignment direction D2 may represent a mean direction of parallelly aligned directions when the second pretilt liquid crystals P2 and the second liquid crystal molecules P2-1 are parallelly aligned on the second lower alignment area L_AA2. The third liquid crystal alignment direction D3 may represent a mean direction of parallelly aligned directions when the second pretilt liquid crystals P2 and the second liquid crystal molecules P2-1 are parallelly aligned on the third lower alignment area L_AA3. The fourth liquid crystal alignment direction D2 may represent a mean direction of parallelly aligned directions when the second pretilt liquid crystals P2 and the second liquid crystal molecules P2-1 are parallelly aligned on the fourth lower alignment area L_AA4.

The first alignment layer AL1 includes upper alignment areas U_AA1, U_AA2, U_AA3 and U_AA4. The upper alignment areas U_AA1, U_AA2, U_AA3 and U_AA4 include a first upper alignment area U_AA1, a second upper alignment area U_AA2, a third upper alignment area U_AA3, and a fourth upper alignment area U_AA4. The upper alignment areas U_AA1, U_AA2, U_AA3 and U_AA4 may correspond to overlap the domains DM1, DM2, DM3 and DM4 in a sixth direction D6 and seventh direction D7.

In such an embodiment, the first alignment layer AL1 includes the first reactive mesogens. In such an embodiment, an amount of first reactive mesogens may be less than that of second reactive mesogens as described above. In another exemplary embodiment, the amount of first reactive mesogens may be negligibly less in comparison to that of second reactive mesogens. Thus, the amount of first pretilt liquid crystals P1 on each of the first, second, third and fourth upper alignment areas U_AA1, U_AA2, U_AA3 and U_AA4 may be negligibly less in comparison to that of second pretilt liquid crystals P2. Also, the amount of first liquid crystal molecules P1-1 may be negligibly less in comparison to that of second pretilt liquid crystal molecules P2-1. When a degree of an arrangement of the second liquid crystal molecules P2-1 of the first lower alignment area L_AA1 in the first liquid crystal alignment direction DR1 is defined as a first scalar value, and a degree of an arrangement of the first liquid crystal molecules P1-1 of the first upper alignment area U_AA1 in the first liquid crystal alignment direction DR1 is defined as a second scalar value, the second scalar value may be significantly less than the first scalar value. Since the first liquid crystal molecules P1-1 are not substantially pretilted, a parallelly aligned rate of the first liquid crystal molecules P1-1 on the first upper alignment area U_AA1 may be substantially, e.g., significantly, less than that of the second liquid crystal molecules P2-1 on the first lower alignment area L_AA1. Also, the number of first liquid crystal molecules P1-1 that are aligned in parallel to the first liquid crystal alignment direction DR1 may be significantly less than that of second liquid crystal molecules P2-1 that are aligned in parallel to the first liquid crystal alignment direction DR1.

Similarly, when the electric fields are applied to the liquid crystal layer LC, the first liquid crystal molecules P1-1 may be weakly aligned in the second liquid crystal alignment direction DR2 on the second upper alignment area U_AA2, be weakly aligned in the third liquid crystal alignment direction DR3 on the third upper alignment area U_AA3, and be weakly aligned in the fourth liquid crystal alignment direction DR4 on the fourth upper alignment area U_AA4.

Referring to FIGS. 6A to 6E, when viewed in the fifth direction D5, the first and second alignment layers AL1 and AL2 have overlapping areas OVA1, OVA2 OVA3, OVA4, OVA5, and OVA6 which overlap each other. The overlapping areas OVA1, OVA2 OVA3, OVA4, OVA5 and OVA6 include a first overlapping area OVA1, a second overlapping area OVA2, a third overlapping area OVA3, a fourth overlapping area OVA4, a fifth overlapping area OVA5, and a sixth overlapping area OVA6.

When the electric fields are applied to the liquid crystal layer LC, an optical axis direction of the liquid crystal layer LC may be equal to a mean value of the parallelly aligned direction of the second liquid crystal molecules P2-1 on the lower alignment areas L_AA1, L_AA2, L_AA3, and L_AA4 and the parallelly aligned direction of the first liquid crystal molecules P1-1 on the upper alignment areas U_AA1, U_AA2, U_AA3, and U_AA4.

The second overlapping area OVA2 may be an area on which the second lower alignment area L_AA2 and the first upper alignment area U_AA1 overlap each other. Since the first liquid crystal molecules P1-1 are not substantially pretilted and the second liquid crystal molecules P2-1 are pretilted, a parallelly aligned rate of the first liquid crystal molecules P1-1 on the first overlapping area OVA1 may be significantly less than that of the second liquid crystal molecules P2-1. Also, the number of first liquid crystal molecules P1-1 that are aligned in parallel to the second liquid crystal alignment direction DR2 may be significantly less than that of second liquid crystal molecules P2-1 that are aligned in parallel to the first liquid crystal alignment direction DR1.

Thus, when the electric fields are applied to the liquid crystal layer LC, the optical axis direction of the liquid crystal layer LC on the second overlapping area OVA2 may be substantially parallel to the second liquid crystal alignment direction DR2. Similarly, when the electric fields are applied to the liquid crystal layer LC, an optical axis direction of the liquid crystal layer LC on the fifth overlapping area OVA5 may be substantially parallel to the fourth liquid crystal alignment direction DR4.

The parallelly aligned direction of the second liquid crystal molecules P2-1 on the first overlapping area OVA1 may be the substantially same as that of the first liquid crystal molecules P1-1. Thus, the optical axis direction of the liquid crystal layer LC on the first overlapping area OVA1 is substantially parallel to the first liquid crystal alignment direction DR1. Similarly, an optical axis direction of the liquid crystal layer LC on the third overlapping area OVA3 is substantially parallel to the second liquid crystal alignment direction DR2, an optical axis direction of the liquid crystal layer LC on the fourth overlapping area OVA4 is substantially parallel to the third liquid crystal alignment direction DR3, and an optical axis direction of the liquid crystal layer LC on the sixth overlapping area OVA6 is substantially parallel to the fourth liquid crystal alignment direction DR4.

The lower polarization plate POL1 has a first transmission axis PA1, and the upper polarization plate POL2 has a second transmission axis PA2. The first transmission axis PA1 and the second transmission axis PA2 are perpendicular to each other. In one exemplary embodiment, for example, when the first transmission axis PA1 is parallel to the second direction D2, the second transmission axis PA2 is parallel to the first direction D1. For convenience of illustration, FIG. 6E show the lower and upper polarization plates POL1 and POL2, each of which has a size relatively less than that of each of the first and second alignment layers AL1 and AL2.

Referring to FIGS. 6A to 6F, the optical axis direction of the liquid crystal layer LC is not substantially parallel to the directions of the first transmission axis PA1 of the lower polarization plate POL1 and the second transmission axis PA2 of the upper polarization plate POL2 within each of the first, second, third, fourth, fifth and sixth overlapping areas OVA1, OVA2 OVA3, OVA4, OVA5, and OVA6 in an exemplary embodiment of the curved display device 500 according to the invention. Thus, the user USER may see light passing through the first, second, third, fourth, fifth, and sixth overlapping areas OVA1, OVA2 OVA3, OVA4, OVA5, and OVA6.

Figure 7A:
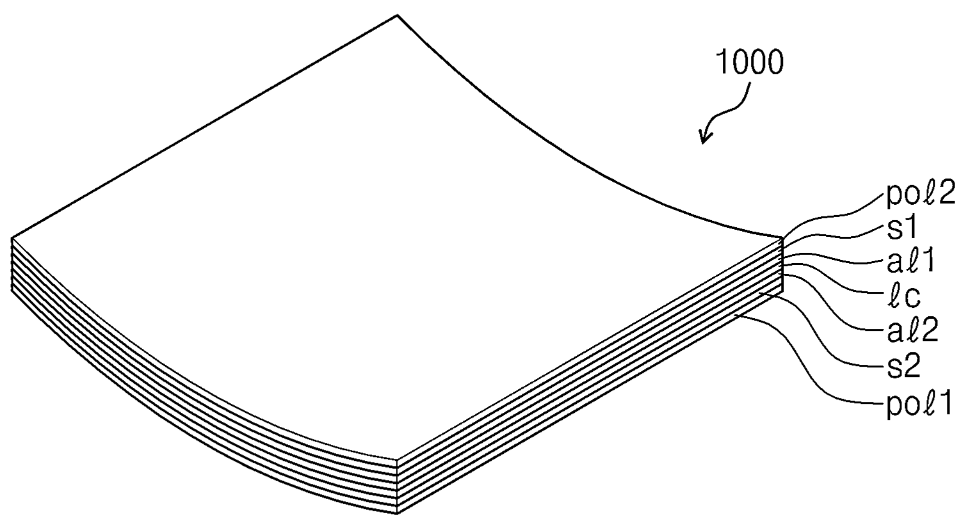
FIG. 7A is a schematic perspective view of a comparative example of a curved display device.
Figure 7B:
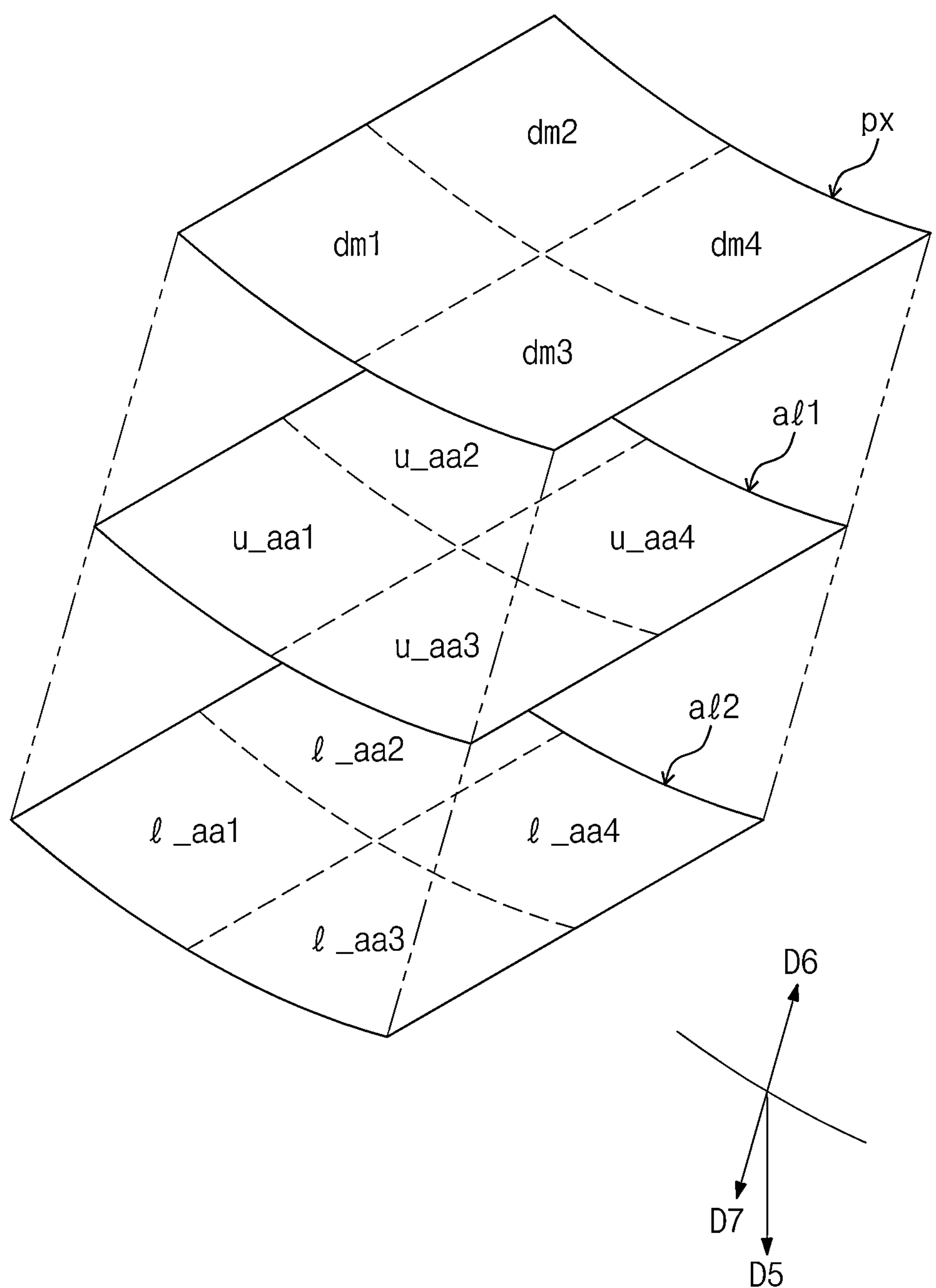
FIG. 7B is a schematic perspective view of a pixel and first and second alignment layers corresponding to the pixel in a comparative example of the curved display device according to the invention.
Figure 7C:
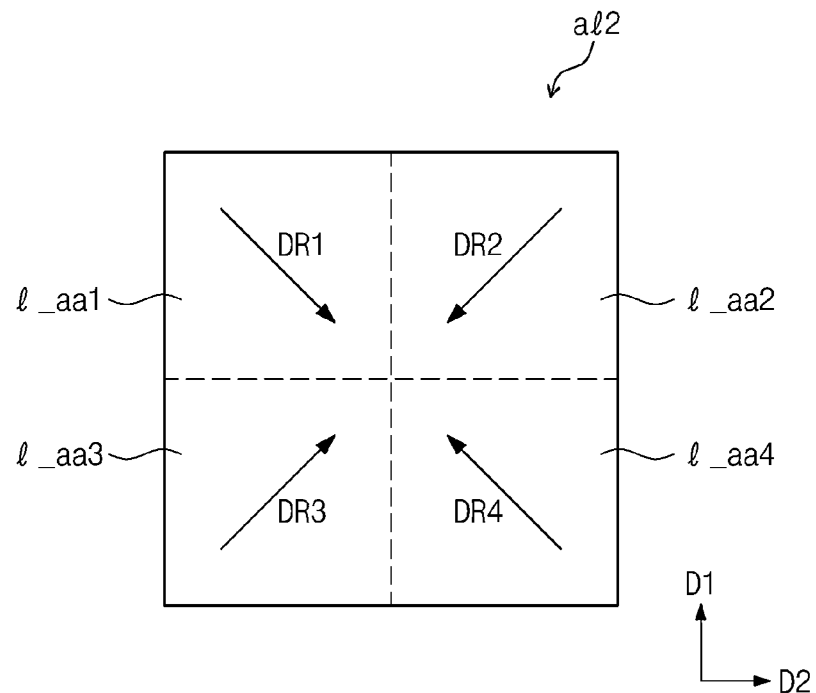
FIG. 7C is a schematic plan view of the first alignment layer shown in FIG. 7B.
Figure 7D:
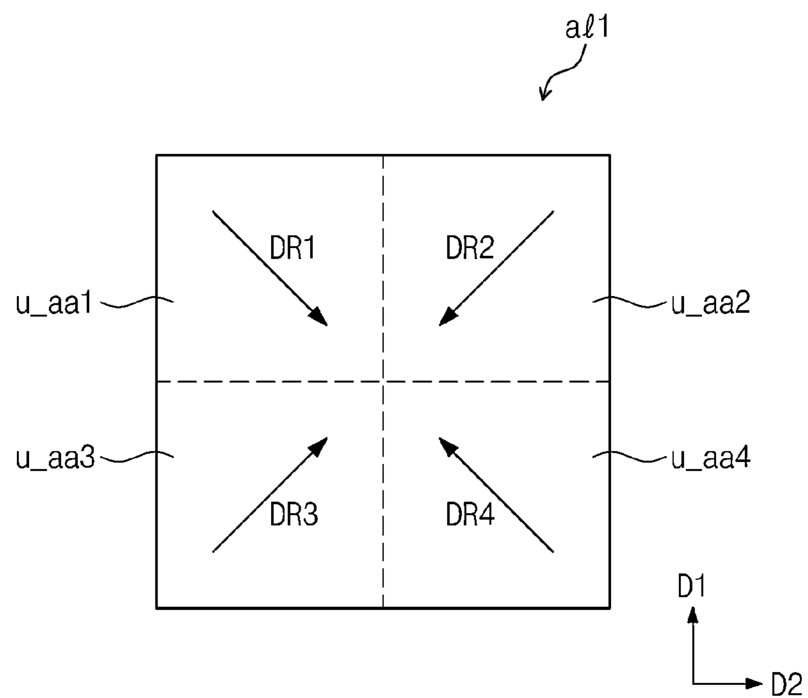
FIG. 7D is a schematic plan view of the second alignment layer shown in FIG. 7B.
Figure 7E:
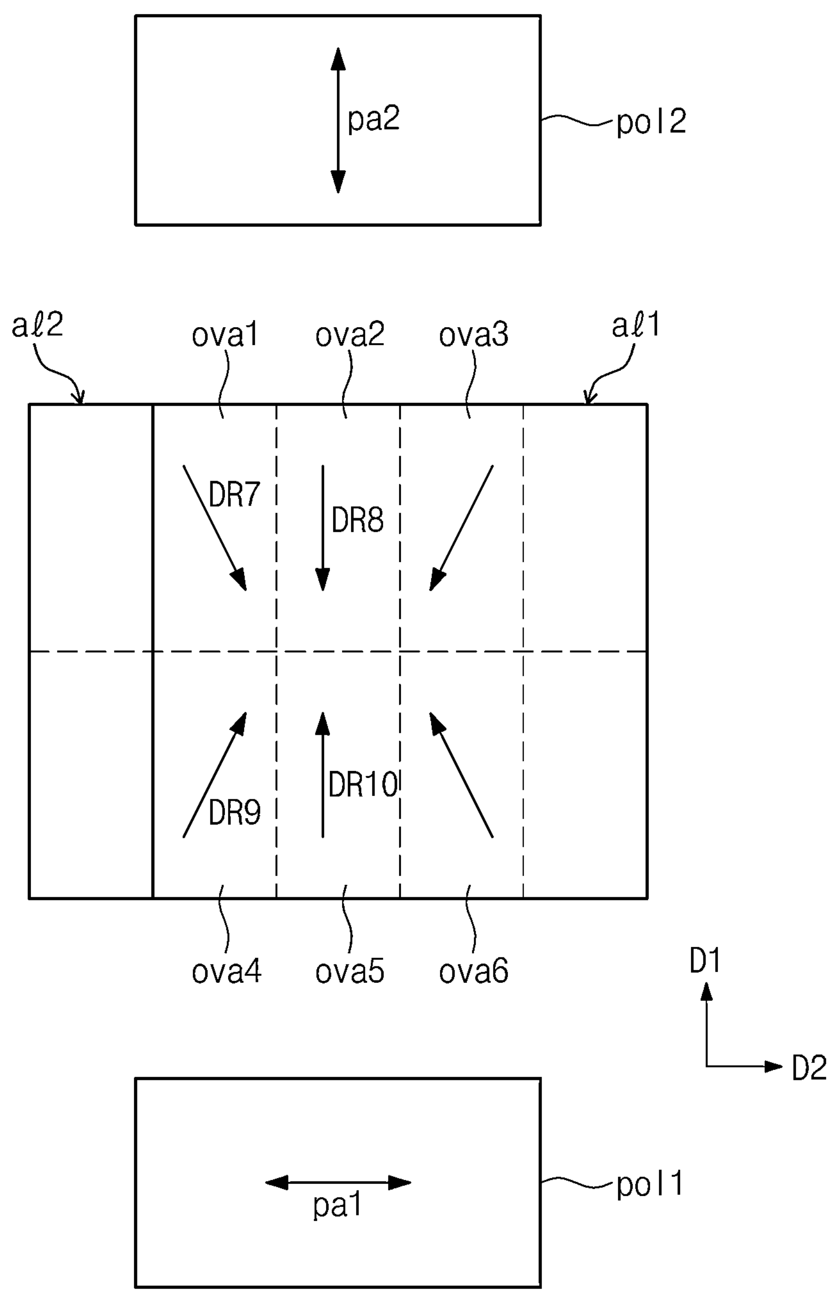
FIG. 7E is a plan view of overlapping areas between the first and second alignment layers and polarization plates in the curved display device shown in FIG. 7B.

FIG. 7A is a schematic perspective view of a comparative example of a curved display device. FIG. 7B is a schematic perspective view of a pixel and first and second alignment layers corresponding to the pixel, which are included in a comparative example the curved display device. FIG. 7C is a schematic plan view of the first alignment layer shown in FIG. 7B. FIG. 7D is a schematic plan view of the second alignment layer shown in FIG. 7B. FIG. 7E is a schematic plan view of overlapping areas between the first and second alignment layers and polarization plates in the curved display device shown in FIG. 7B.

Referring to FIGS. 7A to 7E, a comparative example of a curved display device 1000 includes a first alignment layer AL1 including reactive mesogens that are polymerized with each other and a second alignment layer AL2 including reactive mesogens that are polymerized with each other. The first and second alignment layers AL1 and AL2 may include the reactive mesogens having the substantially same amount as each other. Thus, first liquid crystal molecules of a liquid crystal layer 1*c* are pretilted by the first alignment layer AL1, and second liquid crystal molecules of the liquid crystal layer 1*c* are pretilted by the second alignment layer AL2. Also, a pretilt-angle of the first liquid crystal molecules may be the same as a pretilt-angle of the second liquid crystal molecules. When electric fields are applied to the liquid crystal layer 1*c*, the second liquid crystal molecules on lower alignment areas 1_aa1, 1_aa2, 1_aa3, and 1_aa4 provided on the second alignment layer A12 and the first liquid crystal molecules on upper alignment areas u_aa1, u_aa2, u_aa3, and u_aa4 provided on the first alignment layer AL1 are parallelly aligned in the same direction. Since all of the first and second liquid crystal molecules are pretilted, rates at which the first and second liquid crystal molecules are parallelly aligned may be similar to each other.

In such a comparative example of the curved display device 1000, when a driving voltage is applied to apply the electric fields, the second liquid crystal molecules on the first lower alignment area 1_aa1 and the first liquid crystal molecules on the first upper alignment area u_aa1 are parallelly aligned in a first liquid crystal alignment direction DR1, and the second liquid crystal molecules on the second lower alignment area 1_aa2 and the first liquid crystal molecules on the second upper alignment area u_aa2 are parallelly aligned in a second liquid crystal alignment direction DR2. The second liquid crystal molecules on the third lower alignment area 1_aa3 and the first liquid crystal molecules on the third upper alignment area u_aa3 are parallelly aligned in a third liquid crystal alignment direction DR3, and the second liquid crystal molecules on the fourth lower alignment area 1_aa4 and the first liquid crystal molecules on the fourth upper alignment area u_aa4 are parallelly aligned in a fourth liquid crystal alignment direction DR4.

Referring to FIG. 7D, when viewed in a fifth direction D5, the first and second alignment layers AL1 and AL2 have overlapping areas ova1, ova2, ova3, ova4, ova5 and ova6, which overlap each other. The overlapping areas ova1, ova2, ova3, ova4, ova5, and ova6 include a first overlapping area ova1, a second overlapping area ova2, a third overlapping area ova3, a fourth overlapping area ova4, a fifth overlapping area ova5 and a sixth overlapping area ova6.

In such a comparative example of the curved display device 1000, all of the first and second liquid crystal molecules are pretilted at substantially the same pretilt-angle on the second overlapping area ova2. Thus, an optical axis direction of the liquid crystal layer 1*c* on the second overlapping area ova2 is substantially parallel to an eighth liquid crystal alignment direction DR8 that is the sum of the first and second liquid crystal alignment directions DR1 and DR2. Similarly, an optical axis direction of the liquid crystal layer 1*c* on the fifth overlapping area ova5 is substantially parallel to a tenth liquid crystal alignment direction DR10 that is the sum of the third and fourth liquid crystal alignment directions DR3 and DR4.

Such a comparative example of the curved display device 1000 may also include a lower polarization plate pol1 and an upper polarization plate pol2. Here, a first transmission axis pa1 of the lower polarization plate pol1 and a second transmission axis pa2 of an upper polarization plate pol2 are perpendicular to each other. In such a comparative example of the curved display device 1000, when the first transmission axis pa1 of the lower polarization plate pol1 is parallel to the second direction D2, the second transmission axis pa2 of the upper polarization plate pol2 is parallel to the first direction D1. The first direction D1 may be parallel to the eighth liquid crystal alignment direction DR8 or the tenth liquid crystal alignment direction DR10.

Thus, when the driving voltage is applied to apply the electric fields in such a comparative example of the curved display device 1000, the optical axis direction of the liquid crystal layer 1*c* within the second and fifth overlapping areas ova2 and ova5 may be parallel to a direction of the first transmission layer pa1 of the lower polarization plate pol1 or the second transmission layer pa2 of the upper polarization plate pol2.

When the direction of the first transmission axis pa1 of the lower polarization plate pol1 is parallel to the optical axis direction of the liquid crystal layer 1*c* within each of the second and sixth overlapping areas ova2 and ova6, light passing through the lower polarization plate pol1 may be blocked by the second transmission axis pa2 of the upper polarization plate pol2 after passing through the second and fifth overlapping area ova2 and ova5.

In such a comparative example of the curved display device 1000, when the direction of the second transmission axis pa2 of the upper polarization plate pol2 is parallel to the optical axis direction of the liquid crystal layer 1*c* within each of the second and fifth overlapping areas ova2 and ova5, light passing through the lower polarization plate pol1 may be blocked without passing through the second and fifth overlapping area ova2 and ova5. Thus, the user may see light passed through the second and fifth overlapping areas ova2 and ova5.

That is, in such a comparative example of the curved display device 1000, the first liquid crystal molecules on the lower alignment areas 1_aa1, 1_aa2, 1_aa3, 1_aa4 of the second alignment layer AL2 and the first liquid crystal molecules on the upper alignment areas u_aa1, u_aa2, u_aa3, u_aa4 of the first alignment layer AL1 are aligned in the same direction. Thus, when the first and second substrates are curved, the user may not see light passed through the second and fifth overlapping areas ova2 and ova5, to thereby cause texture defects as the light is darkly seen within the pixel.

In an exemplary embodiment of the curved display device according to invention (e.g., the exemplary embodiments of the curved display device 10 described above with reference to FIG. 6A to 6F), the pretilted degrees of the first and second liquid crystal molecules (see reference symbols P1-1 and P2-1 of FIG. 4A) are different from each other by the first and second alignment layers (see reference symbols AL1 and AL2 of FIG. 6B). Thus, when such an embodiment of the curved display device 10 is curved, the texture defects may not occur such that the display quality of the curved display device 10 is substantially improved.

Figure 8A:
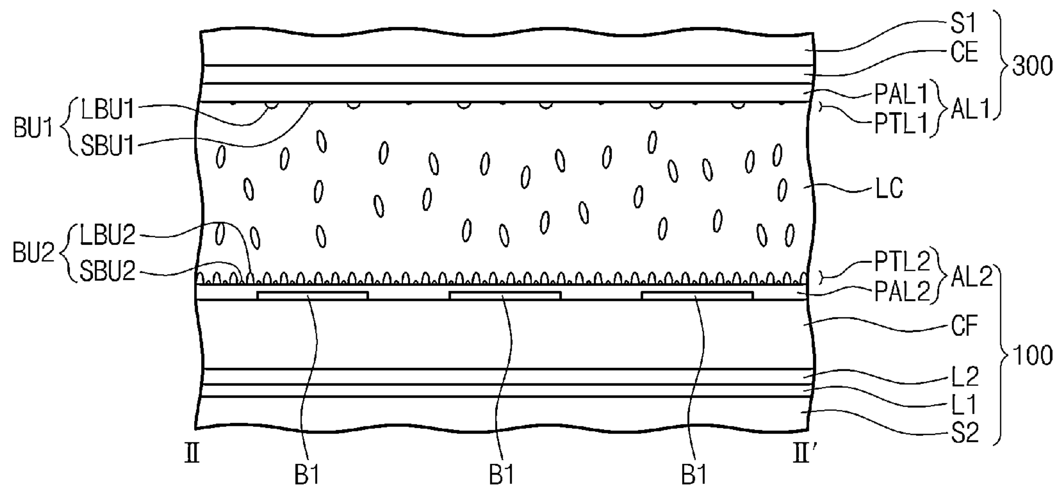
FIGS. 8A and 8B are views illustrating an exemplary embodiment of a method for forming first and second pretilt liquid crystals illustrated in FIG. 4A.
Figure 8B:
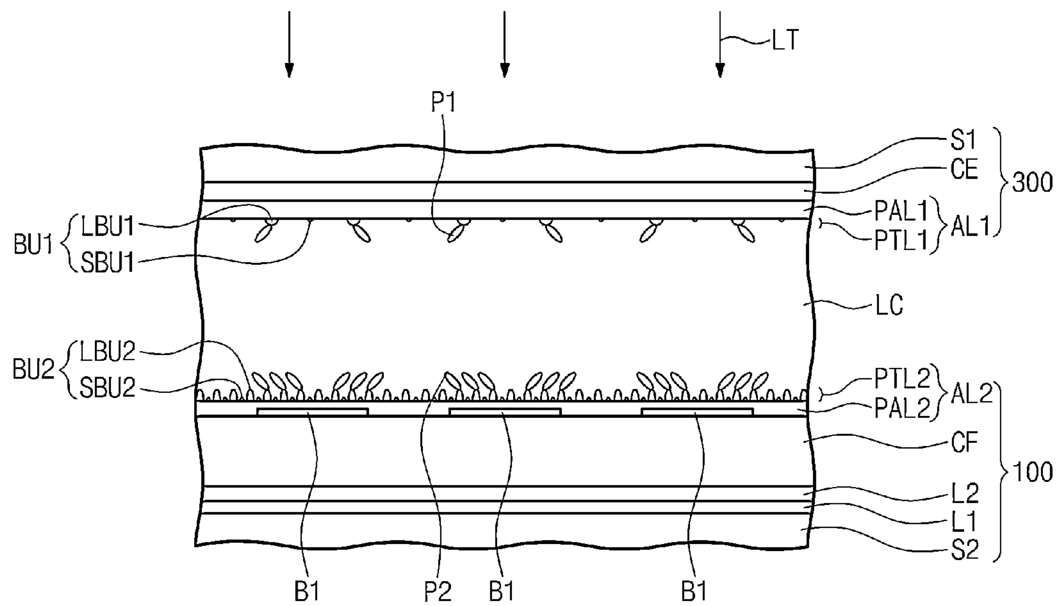

FIGS. 8A and 8B are views illustrating an exemplary embodiment of a method for forming the first and second pretilt liquid crystals illustrated in FIG. 4A.

Referring to FIG. 8A, a display substrate 100 is completely manufactured, and an opposite substrate 300 is completely manufactured. Then, liquid crystal molecules are provided to one of the display substrate 100 and the opposite substrate 300 to couple the display substrate 100 to the opposite substrate 300. As a result, a liquid crystal layer LC including the liquid crystal molecules is provided, e.g., formed, between the display substrate 100 and the opposite substrate 300.

When the display substrate 100 and the opposite substrate 300 are coupled to each other, a first alignment layer AL1 is exposed to the liquid crystal layer LC on the opposite substrate 300, and a second alignment layer AL2 is exposed to the liquid crystal layer LC on the display substrate 100. In such an embodiment, the first alignment layer AL1 includes first reactive mesogens RM10, and the second alignment layer AL2 includes second reactive mesogens RM20. In such an embodiment, an amount of second reactive mesogens RM20 may be greater than that of first reactive mesogens RM10.

Referring to FIG. 8B, in a state where a potential difference between a pixel electrode PE and common electrode CE occurs to generate electric fields in the liquid crystal layer LC, light LT is irradiated onto the liquid crystal layer LC. As a result, the liquid crystal molecules are aligned by the electric fields. Simultaneously, the liquid crystal molecules in which the first and second reactive mesogens RM10 and RM20 are aligned by the irradiated light are cured. A second base layer PAL2 may include a photoinitiator, and a first base layer PAL1 may not include the photoinitiator. As a result, the most reactive mesogens may move into the second base layer PAL2, but may not substantially move into the first base layer PAL1.

The second base layer PAL2 may be formed by using a second alignment solution containing the photoinitiator, and the first base layer PAL1 may be formed by using a first alignment solution that does not contain the photoinitiator.

The second alignment solution may include a photoinitiator, a second solvent and a second alignment agent. The second alignment solution may further include reactive mesogens.

In one exemplary embodiment, for example, the photoinitiator of the second alignment solution may include at least one of benzyl dimethyl ketal, α-hydroxyketone, methylbenzoylformate, acrylophosphine oxide, titALocene, α-amonoketone, α-aminoacetophenone, oxime ester, benzophenone, phenyletone, α-dichloro, acetophenone, α-choro, thioxALthone, and benzionalkylether.

In one exemplary embodiment, for example, the photoinitiator of the second alignment solution may include a commercialized photoinitiator of the photoinitiator including Irgacure® 651, Irgacure® 127, Irgacure® 754, Irgacure® 819, Irgacure® 784, Irgacure® 907, Irgacure® 369, Irgacure® 379, Irgacure® 2959, Irgacure® OXE01, Irgacure® OXE02, Darocure® TPO, which are manufactured by BASF Co. Ltd.

In one exemplary embodiment, for example, the second solvent of the second alignment solution may include one of γ-butyrolactone, ethylene glycol butyl ether, and N-methylpyrrolidone or a mixing solution of at least two of γ-butyrolactone, ethylene glycol butyl ether, and N-methylpyrrolidone.

In one exemplary embodiment, for example, the second alignment solution may include a monomer, dimer, or oligomer of polymers such as polyimide, poly(amic acid), polyamide, poly(amic imide), polyester, polyethylene, polyurethane, or polystyrene or a mixture thereof.

In one exemplary embodiment, for example, the first alignment solution may include a first solvent and a first alignment agent. The first solvent may include one of γ-butyrolactone, ethylene glycol butyl ether, and N-methylpyrrolidone or a mixing solution of at least two of γ-butyrolactone, ethylene glycol butyl ether, and N-methylpyrrolidone.

In one exemplary embodiment, for example, the first alignment solution may include a monomer, dimer, or oligomer of polymers such as polyimide, poly(amic acid), polyamide, poly(amic imide), polyester, polyethylene, polyurethane, or polystyrene or a mixture thereof.

The second solvent and a first solvent of the first alignment solution may be substantially the same as or different from each other. Also, the second alignment agent and the first alignment agent may be substantially the same as or different from each other.

The reactive mesogens that move into the second base layer PAL2 may be polymerized with each other to form second protrusions BU2, and a small amount of reactive mesogens moving into the first base layer PAL1 may be polymerized with each other to form first protrusions BU1. The second protrusions BU2 may include second small-size protrusions SBU2 and second large-size protrusions LBU2. The first protrusions BU1 may include first small-size protrusions SBU1 and first large-size protrusions LBU1.

The liquid crystal molecules adjacent to the second alignment layer AL2 of the liquid crystal molecules may be fixed or pretilted to the second alignment layer AL2 by the second protrusions BU2. As a result, second pretilt liquid crystals P2 are formed on the second alignment layer AL2.

In such an embodiment, where an amount of second reactive mesogens is greater than that of first reactive mesogens, an amount of second pretilt liquid crystals P2 may be greater than that of first pretilt liquid crystals P1. In such an embodiment, since an amount of second reactive mesogens respectively coupled or adjacent to the second pretilt liquid crystals P2 is greater than that of first reactive mesogens respectively coupled or adjacent to the first pretilt liquid crystals P1, a pretilt-angle of the second pretilt liquid crystals P2 may be greater than that of the first pretilt liquid crystals P1.

Figure 9:
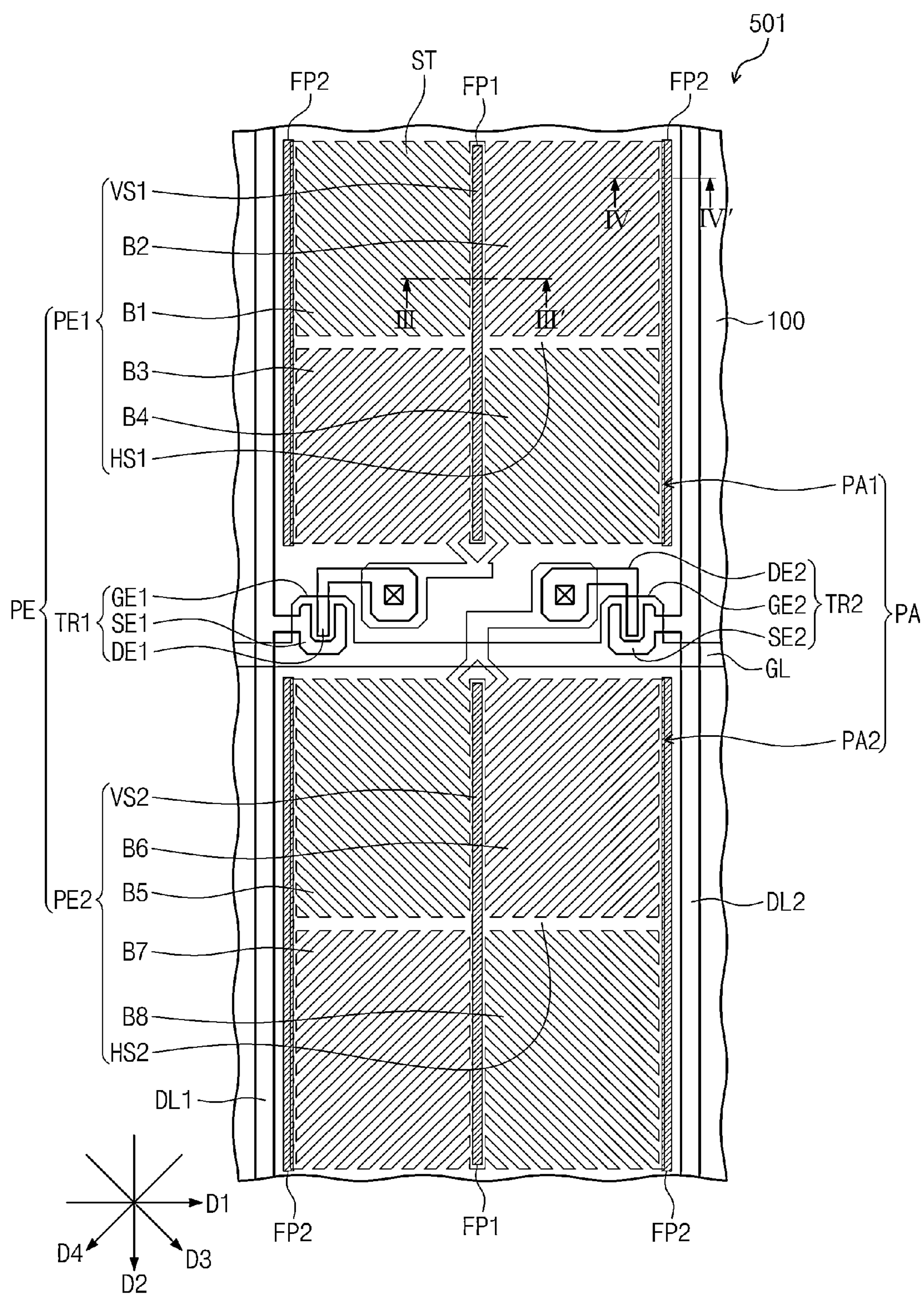
FIG. 9 is a plan view of a pixel of an alternative exemplary embodiment of a curved display device according to the invention.
Figure 10A:
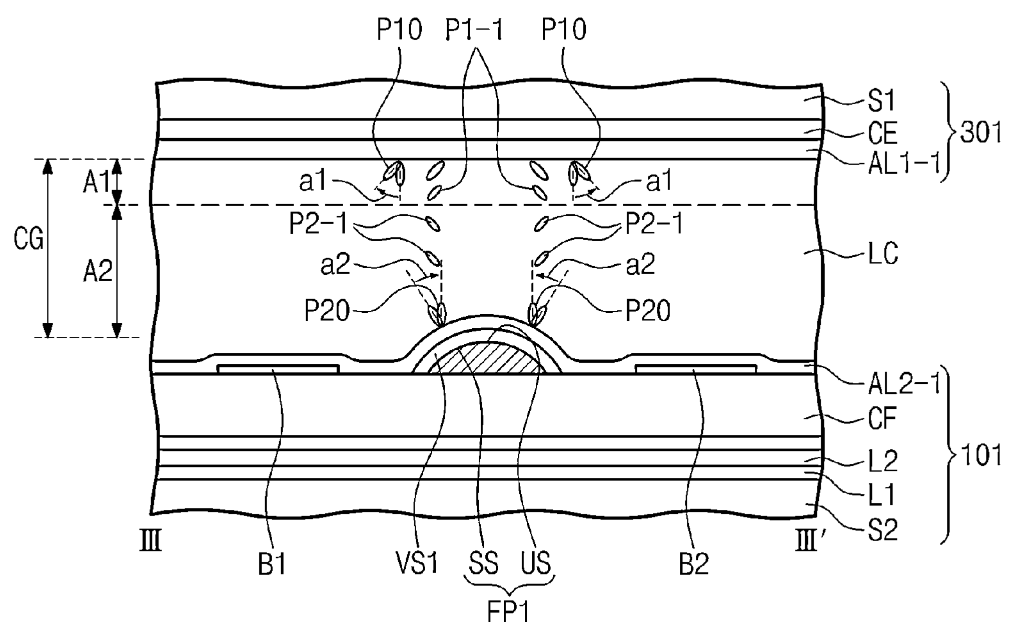
FIG. 10A is a cross-sectional view taken along line III-III' of FIG. 9.
Figure 10B:
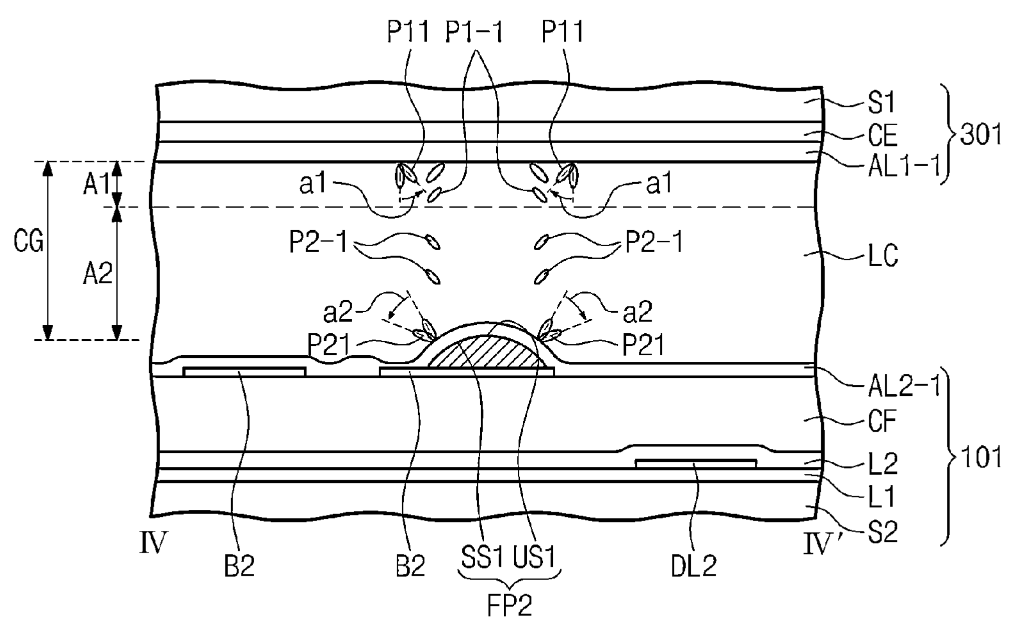
FIG. 10B is a cross-sectional view taken along line IV-IV' of FIG. 9.

FIG. 9 is a plan view of a pixel of an alternative exemplary embodiment of a curved display device according to the invention, FIG. 10A is a cross-sectional view taken along line III-III' of FIG. 9, and FIG. 10B is a cross-sectional view taken along line IV-IV' of FIG. 9. The curved display device 501 shown in FIGS. 9, 10A and 10B is substantially the same as the curve display device 500 shown in FIGS. 2 to 4C except for protrusions FP1 and FP2. The same or like elements shown in FIGS. 9, 10A and 10B have been labeled with the same reference characters as used above to describe the exemplary embodiments of the curved display device 500 shown in FIGS. 2 to 4C, and any repetitive detailed description thereof will hereinafter be omitted or simplified.

Referring to FIGS. 9 and 10A, an exemplary embodiment of a curved display device 501 includes a display substrate 101, an opposite substrate 301 and a liquid crystal layer LC. In such an embodiment, the opposite substrate 301 includes a first base substrate S1, a common electrode CE and a first alignment layer AL1-1. The display substrate 101 includes a second base substrate S2, a pixel electrode PE, a second alignment layer AL2-1, first protrusions FP1 and second protrusions FP2.

Each of the plurality of first protrusions FP1 extends in a second direction D2 on a plane. The plurality of first protrusions FP1 may include an insulation material that is capable of absorbing light, e.g., a material of a light blocking layer BM shown in FIG. 3B. IN such an embodiment, one of the plurality of first protrusions FP1 may be disposed between the second base substrate S2 and first vertical stem part VS1 of a first sub pixel electrode PE1 to overlap the first vertical stem part VS1 on a plane. The other one of the plurality of first protrusions FP1 may be disposed between the second base substrate S2 and a second vertical stem part VS2 of a second sub pixel electrode PE2 to overlap the second vertical stem part VS2 on a plane.

In an exemplary embodiment, as shown in FIG. 4A, amounts of first and second reactive mesogens RM10 and RM20 are different from each other over a pixel area PA so that the pretilt-angles of the first and second pretilt liquid crystals P1 and P2 are different from each other. In an alternative exemplary embodiment, as shown in FIGS. 10A and 10B, the pretilt-angles of the first and second pretilt liquid crystals P10 and P20 are set to be different from each other on a portion of the pixel area PA by the plurality of first protrusions FP1. In such an embodiment, the plurality of first protrusions FP1 have structures and functions similar to each other, and a structure and function of one of the first protrusion FP1, which overlaps the first vertical stem part VS1 will hereinafter be described in detail for convenience of description.

In such an embodiment, the first protrusion FP1 may have a shape that protrudes toward the liquid crystal layer LC in a cross-section. Thus, the uppermost side US and a protruded or tilted surface SS may be defined on the first protrusion FP1 in the cross-section. The tilted surface SS may be connected to the uppermost side US and tilted toward the second base substrate SS.

Since the first protrusion FP1 is disposed between the first vertical stem part VS1 and the second base substrate S2, a distance between the first vertical stem part VS1 and the common electrode CE may be reduced by a thickness of the first protrusion part FP1. Thus, due to the reduced distance between the first vertical stem part VS1 and the common electrode CE by of the first protrusion part FP1, an intensity of first electric field generated between the first vertical stem part VS1 disposed on the first protrusion FP1 and the common electrode CE may be less than that of a second electric field generated between each of first and second branch parts B1 and B2 and the common electrode CE. In such an embodiment, a fringe field of the first electric field may increase by the shape of the tilted surface SS.

Liquid crystals that are pretilted by a flat portion of the first alignment layer AL1-1 may be defined as first pretilt liquid crystals P10, and liquid crystals adjacent to a curved portion of the second alignment layer AL2-1 to correspond to a position of the tilted surface SS may be defined as second pretilt liquid crystals P20. In such an embodiment, as described above, when the intensity of the first electric field is greater than that of the second electric field, and the intensity of the fringe field of the first electric field is increased to be greater than the second electric field, the second pretilt liquid crystals P20 may be tilted toward the upper most side US. Thus, a second pretilt-angle a2 of the second pretilt liquid crystals P20 may be greater than a first pretilt-angle a1 of the first pretilt liquid crystals P10. In such an embodiment, the first and second pretilt-angles a1 and a2 are affected by the intensities and directions of the first and second electric fields because a light irradiation process for fixing the first and second pretilt liquid crystals P10 and P20 to the first and second alignment layers AL1-1 and AL2-1 is performed in a state where the first and second electric fields are formed.

Thus, as described with reference to FIGS. 4A to 4C, in such an embodiment, where the second pretilt-angle a2 is greater than the first pretilt-angle a1, the tendency in which the liquid crystal molecules behave by the second pretilt liquid crystals P20 may be stronger than that in which the liquid crystal molecules behave by the first pretilt liquid crystals P10.

Accordingly, in such an embodiment, an amount of second liquid crystal molecules P2-1 that are aligned in parallel to the pretilted direction of the second pretilt liquid crystals P20 in a second space A2 in response to the electric fields may be greater than that of first liquid crystal molecules P1-1 that are aligned in parallel to the pretilted direction of the first pretilt liquid crystals P10 in the first space A1. Thus, in such an embodiment, an amount of liquid crystal molecules that are aligned in directions opposite to each other on an area on which miss-alignment between the display substrate 101 and the opposite substrate 301 occurs is reduced, such that an occurrence of a factor that deteriorates display quality of the curved display device 501 may be reduced.

Referring to FIGS. 9 and 10B, each of a plurality of second protrusions FP2 extends along a second direction D2 on a plane. The plurality of second protrusions FP2 may include an insulation material. Also, one of the plurality of second protrusions FP2 may be disposed on the first sub pixel electrode PE1 to overlap both edges that are parallel to the second direction D2 of the first sub pixel electrode PE1, and the other one of the plurality of second protrusions FP2 may be disposed on the second sub pixel electrode PE2 to overlap both ends that are parallel to the second direction D2 of the second sub pixel electrode PE2. Since the plurality of second protrusions FP2 have structures and functions substantially the same as each other, a structure and function of one of the second protrusion FP2 that overlaps one edge of the second branch part B2 of the first sub pixel electrode PE1 will hereinafter be described in detail.

In such an embodiment, the second protrusion FP2 may have a shape that protrudes toward the liquid crystal layer LC in a cross-section. Thus, the uppermost side US1 and a protruded or tilted surface SS1 may be defined on the second protrusion FP2 in the cross-section. The tilted surface SS1 may be connected to the uppermost side US1 and tilted toward the second base substrate SS.

Unlike the first protrusion FP1, the second protrusion FP2 is disposed on the second branch part B2, such that the intensity of the electric fields generated between the second branch part B2 disposed on the second protrusion FP2 and the common electrode CE may be less than that of the electric fields generated therearound. Simultaneously, the intensity of the fringe field of the electric fields generated on the second branch part B2 disposed on the second protrusion FP2 may increase by the shape of the tilted surface US1.

Liquid crystals adjacent to the flat portion of the first alignment layer AL1-1 may be defined as first pretilt liquid crystals P11, and liquid crystals adjacent to a curved portion of the second alignment layer AL2-1 to correspond to a position of the tilted surface SS1 may be defined as second pretilt liquid crystals P21. In this case, as illustrated in FIG. 8B, the second pretilt liquid crystals P21 may be tilted toward a lower side of the tilted surface SS1 due to characteristics of the electric fields generated on the second branch part B2 disposed on the second protrusion FP2. Thus, a second pretilt-angle a2 of the second pretilt liquid crystals P21 may be greater than a first pretilt-angle a1 of the first pretilt liquid crystals P11.

Thus, as described with reference to FIGS. 4A to 4C, in such an embodiment, the second pretilt-angle a2 is greater than the first pretilt-angle a1, such that the tendency in which the second liquid crystal molecules P2-1 behave by the second pretilt liquid crystals P21 may be stronger than that in which the first liquid crystal molecules P1-1 behave by the first pretilt liquid crystals P11. Thus, an amount of second liquid crystal molecules P2-1 may be greater than that of first liquid crystal molecules P1-1. As a result, since an amount of liquid crystal molecules that are aligned in directions opposite to each other on an area on which miss-alignment between the display substrate 101 and the opposite substrate 301 occurs is reduced, an occurrence of a factor that deteriorates display quality of the curved display device 501 may be reduced.

Hereinafter, features of exemplary embodiments of the invention will be described in greater detail with reference to examples. However, these examples are merely exemplary, and the invention is not limited thereto.

EXAMPLES

Embodiment 1

A second base substrate was prepared, and a second base layer was formed on the second base substrate by using a second alignment solution. A first base substrate was prepared, and a first base layer was formed by using a photoinitiator and first alignment solution. A liquid crystal composite including reactive mesogens was provided between the first base substrate and the second base substrate. Then, light and electric fields were provided to form a first alignment including first large-size protrusions and a second alignment layer including second large-size protrusions. The above-described processes were performed to form a curved display device. Samples #1 and #2 were collected as samples of the second alignment layer of Embodiment 1, which is an example according to the invention, and samples #3 and #4 were collected as samples of the first alignment layer of Embodiment 1.

Comparative Example 1

Comparative Example 1 is the same as Embodiment 1 except that the photoinitiator is not used when the second base layer is formed. A curved display device was formed according to Comparative Example 1. Samples #5 and #6 were collected as samples of the second alignment layer of Comparative Example 1, and samples #7 and #8 were collected as samples of the first alignment layer of Comparative Example 1.

1. Measurement According to Embodiment 1 and Comparison Examples 1

1) AFM Measurement

Atomic force microscopy ("AFM") images of samples #1, #2, #3, and #4 of Embodiment 1 and samples #5, #6, #7, and #8 of Comparative Example 1 were measured by using AFM STA-500. The measured AFM images were illustrated in FIG. 11.

2) Measurement of Distribution of Large-Size Protrusions

① Measurement of Distribution of Large-Size Protrusions Each of which has a Particle Diameter of about 30 nm or More An area on which second large-size protrusions each of which has a particle diameter of about 30 nm or more on the samples #3 and #4 of Embodiment 1 and the samples #7 and #8 of Comparative Example 1 are distributed was measured on the basis of the measured AFM images. Also, an area on which first large-size protrusions, each of which has a particle diameter of about 30 nm or more, on the samples #1 and #2 of Embodiment 1 and the samples #5 and #6 of Comparative Example 1 are distributed was measured based on the measured AFM images. The measured results were illustrated in FIG. 12. The area on which the second large-size protrusions each of which has a particle diameter of about 30 nm or more or the first large-size protrusions each of which has a particle diameter of about 30 nm or more are distributed was illustrated by a gray color in FIG. 12, and an area on which the second large-size protrusions having a particle diameter of about 30 nm or more or the first large-size protrusions having a particle diameter of about 30 nm or more are not distributed was illustrated by a black color in FIG. 12.

② Measurement of Distribution of Large-Size Protrusions Each of which has a Particle Diameter of about 50 nm or More An area on which second large-size protrusions each of which has a particle diameter of about 50 nm or more on the samples #3 of Embodiment 1 and the samples #7 and #8 of Comparative Example 1 are distributed was measured based on the measured AFM images. Also, an area on which first large-size protrusions each of which has a particle diameter of about 50 nm or more on the samples #1 and #2 of Embodiment 1 and the samples #5 and #6 of Comparative Example 1 are distributed was measured based on the measured AFM images. The measured results were illustrated in FIG. 12. The area on which the second large-size protrusions having a particle diameter of about 50 nm or more or the first large-size protrusions having a particle diameter of about 50 nm or more are distributed was illustrated by a gray color in FIG. 13, and an area on which the second large-size protrusions each of which has a particle diameter of about 50 nm or more or the first large-size protrusions each of which has a particle diameter of about 30 nm or more are not distributed was illustrated by a black color in FIG. 13.

2. Result of Measurement According to Embodiment 1 and Comparison Examples 1

Figure 11:
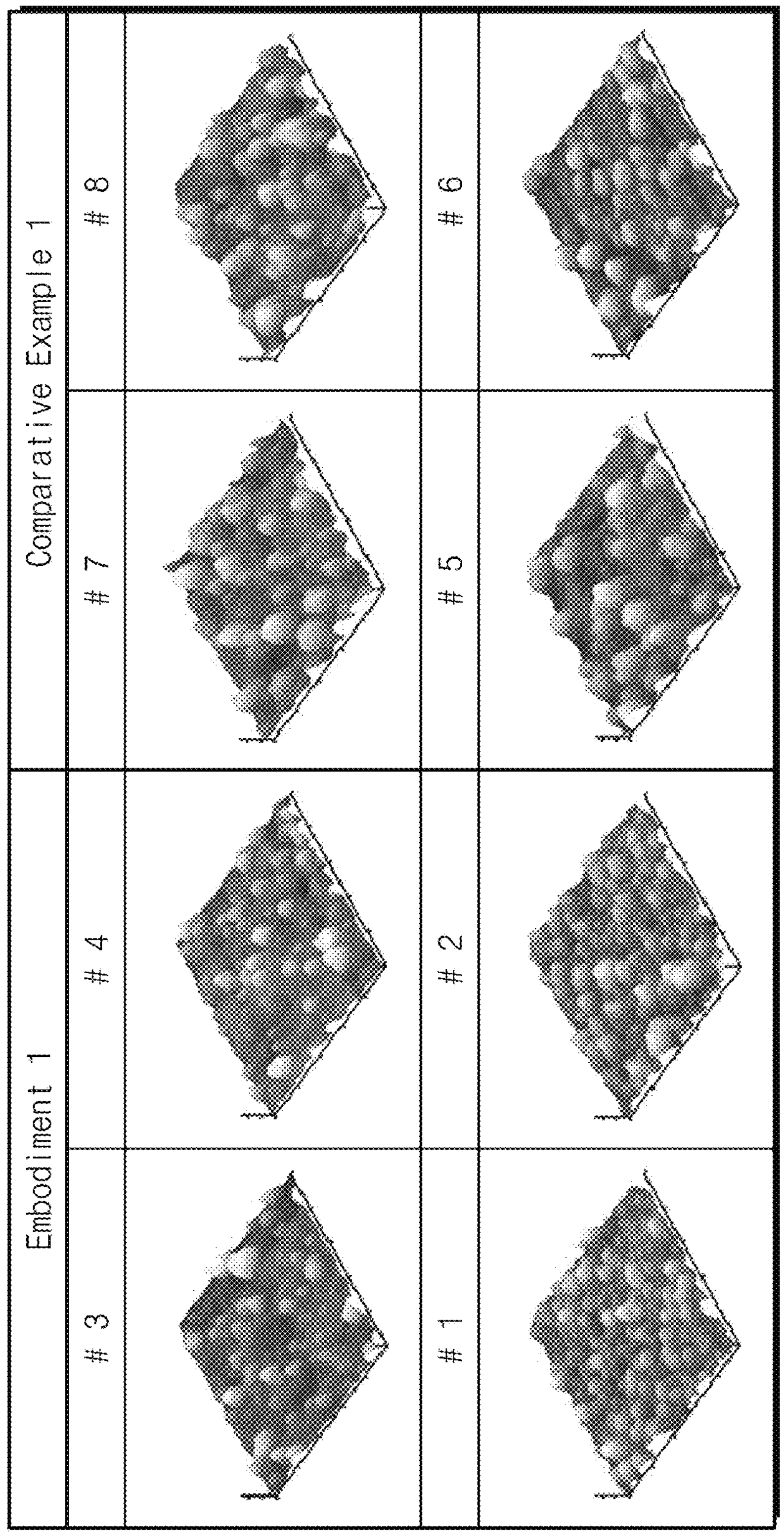
FIG. 11 is a table illustrating an atomic force microscopy ("AFM") image of Embodiment 1 and Comparative Example 1.

1) AFM Analysis of First Large-Size Protrusions and Second Large-Size Protrusions Referring to FIG. 11, it was seen that the shape, number, distribution of the second large-size protrusions on the samples #5 and #6 of Comparative Example 1 are similar to those of the first large-size protrusions on the samples #7 and #8 of Comparative Example 1. However, it was seen that the number of second large-size protrusions on the samples #1 and #2 of Embodiment 1 is significantly greater than that of first large-size protrusions on the samples #3 and #4 of Embodiment 1.

2) Analysis of Distribution of First Large-Size Protrusions and Second Large-Size Protrusions ① Analysis of Distribution of Large-Size Protrusions Each of which has a Particle Diameter of about 30 nm or More Table 1 below shows a surface area of an area on which the first large-size protrusions each of which has a particle diameter of about 30 nm or more and a surface area of an area on which the second large-size protrusions each of which has a particle diameter of about 30 nm or more on the measured AFM images. The sum of a surface area of the area on which the first large-size protrusions each of which has a particle diameter of about 30 nm or more are distributed and a surface area of the area on which the first large-size protrusions each of which has a particle diameter of about 30 nm or more are not distributed on each of the AFM images is $1.0\times10^6$ nm$^2$. The sum of a surface area of the area on which the second large-size protrusions each of which has a particle diameter of about 30 nm or more are distributed and a surface area of the area on which the second large-size protrusions each of which has a particle diameter of about 30 nm or more are not distributed on each of the AFM images is $1.0\times10^6$ nm$^2$.

TABLE 1

| Embodiment 1 | Surface area of distribution area (Unit: nm$^2$) | Surface area of non-distribution area (Unit: nm$^2$) | Number of first or second large-size protrusions | Comparative Example 1 | Surface area of distribution area (Unit: nm$^2$) | Surface area of non-distribution area (Unit: nm$^2$) |
|---|---|---|---|---|---|---|
| #3 | $1.489 \times 10^5$ | $8.511 \times 10^5$ | 43 | #7 | $8.046 \times 10^5$ | $1.954 \times 10^5$ |
| #4 | $2.605 \times 10^5$ | $7.395 \times 10^5$ | 55 | #8 | $6.056 \times 10^5$ | $3.944 \times 10^5$ |
| #1 | $3.471 \times 10^5$ | $6.529 \times 10^5$ | 104 | #5 | $4.983 \times 10^5$ | $5.017 \times 10^5$ |
| #2 | $4.572 \times 10^5$ | $5.428 \times 10^5$ | 71 | #6 | $6.755 \times 10^5$ | $3.245 \times 10^5$ |

Figure 12:
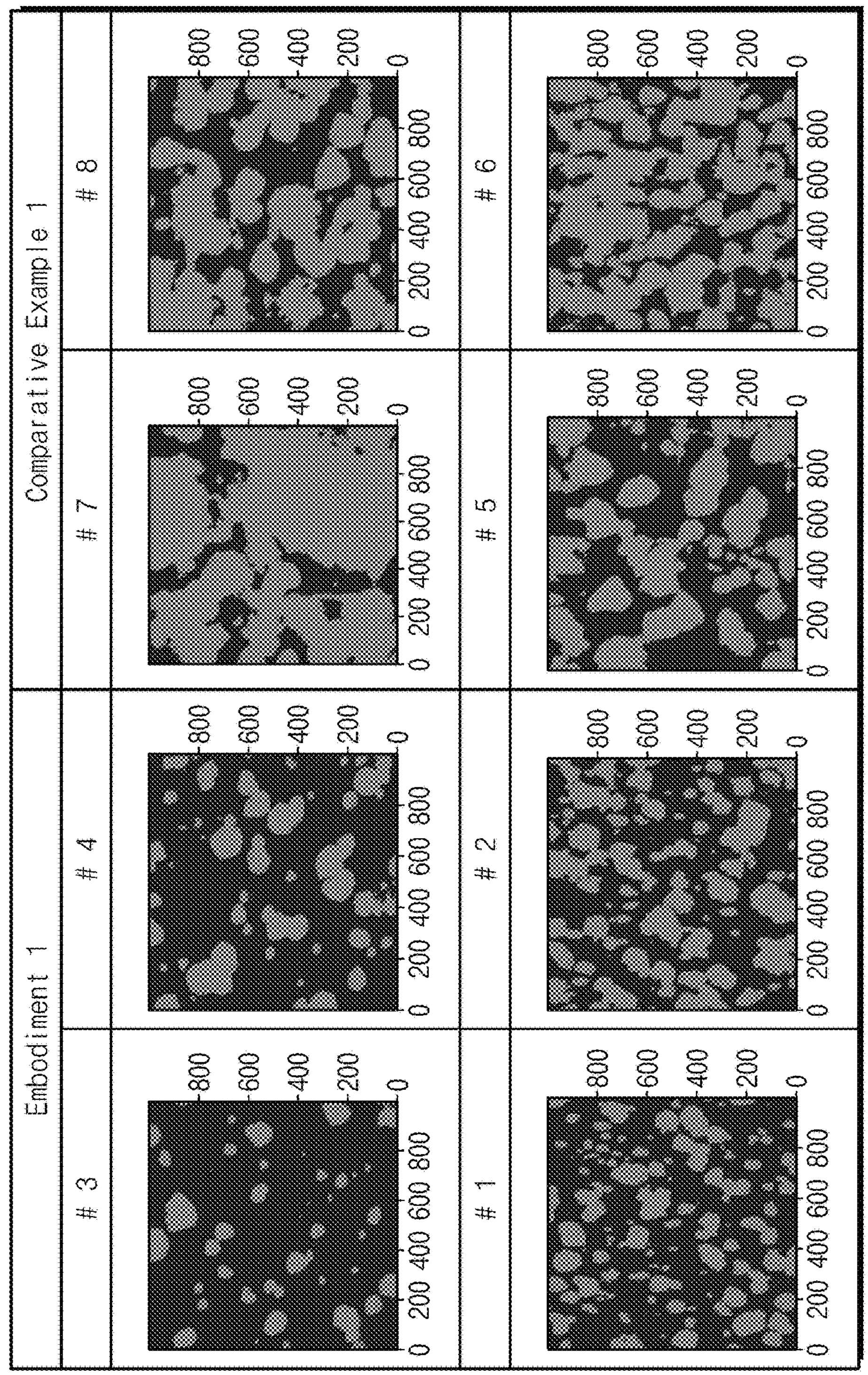
FIG. 12 is a table illustrating a distribution area of large-sized protrusions, each of which has a particle diameter of about 30 nanometers (nm) or more, in the AFM image of Embodiment 1 and Comparative Example 1.

Referring to Table 1 and FIG. 12, in Embodiment 1, it was seen that the surface area of the distribution area of the first large-size protrusions is less than that of the distribution area of the second large-size protrusions. Also, Embodiment 1, it was seen that the surface area of the distribution area of the first large-size protrusions is less than that of the non-distribution area of the first large-size protrusions. Also, it was seen that the surface area of the distribution area of the second large-size protrusions is less than that of the non-distribution area of the second large-size protrusions.

In Embodiment 1, it was seen that the surface area of the distribution area of the first large-size protrusions/the surface area of the distribution area of the second large-size protrusions is approximately 43/100, 32/100, 3/4, and 57/100.

In Embodiment 1, it was seen that the surface area of the distribution area of the first large-size protrusions/the surface area of the non-distribution area of the first large-size protrusions is approximately 1/5, 17/100, 35/100, 3/10.

However, it was seen that a case in which the surface area of the distribution area of the first large-size protrusions is less than that of the distribution area of the second large-size protrusions is confirmed. Also, Comparative Example 1, it was seen that the surface area of the distribution area of the first large-size protrusions is greater than that of the non-distribution area of the first large-size protrusions. Also, it was seen that the surface area of the distribution area of the second large-size protrusions is less or greater than that of the non-distribution area of the second large-size protrusions.

② Analysis of Distribution of Large-Size Protrusions Each of which has a Particle Diameter of about 50 nm or More Table 2 below shows an area on which the first large-size protrusions each of which has a particle diameter of about 50 nm or more and an area on which the second large-size protrusions each of which has a particle diameter of about 50 nm or more on the measured AFM images. The sum of a surface area of the area on which the first large-size protrusions each of which has a particle diameter of about 50 nm or more are distributed and a surface area of the area on which the first large-size protrusions each of which has a particle diameter of about 50 nm or more are not distributed is $1.0\times10^6$ nm$^2$. The sum of a surface area of the area on which the second large-size protrusions each of which has a particle diameter of about 50 nm or more are distributed and a surface area of the area on which the second large-size protrusions each of which has a particle diameter of about 50 nm or more are not distributed on each of the AFM images is $1.0\times10^6$ nm$^2$.

Figure 13:
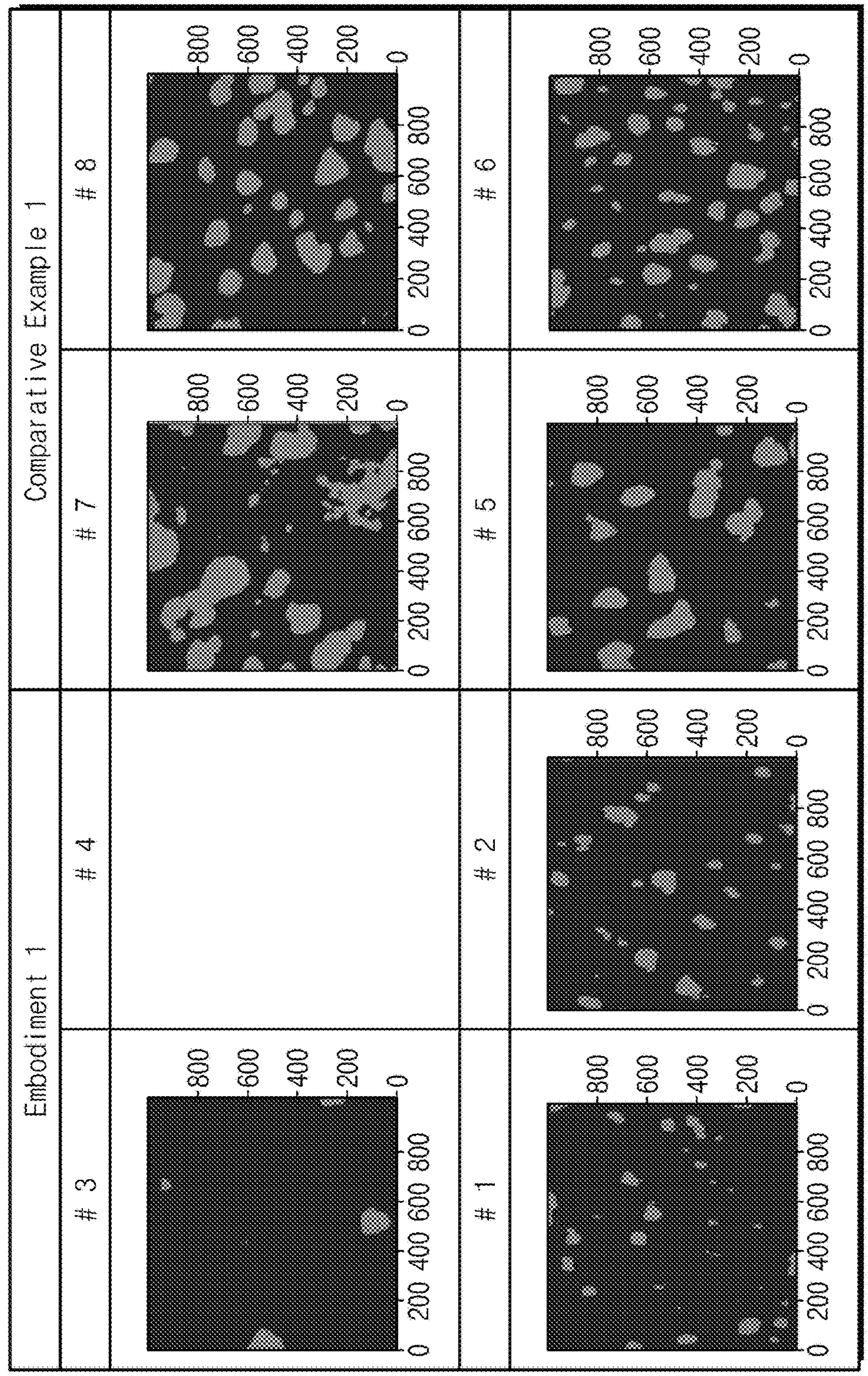
FIG. 13 is a table illustrating a distribution area of large-sized protrusions, each of which has a particle diameter of about 50 nm or more, in the AFM image of Embodiment 1 and Comparative Example 1.

Referring to Table 2 and FIG. 13, in Embodiment 1, it was seen that the surface area of the distribution area of the first large-size protrusions is less than that of the distribution area of the second large-size protrusions.

In Embodiment 1, it was seen that the surface area of the distribution area of the first large-size protrusions/the surface area of the distribution area of the second large-size protrusions is approximately 42/100, and 32/100.

In Embodiment 1, it was seen that the surface area of the distribution area of the first large-size protrusions/the surface area of the non-distribution area of the first large-size protrusions is approximately 24/1000.

However, in Comparative Example 1, it was seen that the surface area of the distribution area of the first large-size protrusions is less than that of the distribution area of the second large-size protrusions. Also, it was seen that the surface area of the distribution area of the first large-size protrusions/the surface area of the non-distribution area of the first large-size protrusions is approximately 3/10 and 4/10.

In an exemplary embodiment of the curved display device, even though the miss-alignment occurs when the display substrate and opposite substrate which are coupled or adjacent to each other are curved, the pretilt-angles of the pretilt liquid crystals of each of the alignment layer of the display substrate and the alignment layer of the opposite substrate may be adjusted to reduce the liquid crystal molecules that are aligned in directions opposite each other in response to the electric fields in the area on which the miss-alignment occurs. Therefore, in such an embodiment, the display quality of the curved display device may be effectively prevented from being deteriorated as an amount of liquid crystal molecules that are aligned in the direction opposite to each other increases.

It will be apparent to those skilled in the art that various modifications and variations can be made in the invention. Thus, it is intended that the invention covers the modifications and variations of this invention provided they come within the scope of the appended claims and their equivalents. Hence, the real protective scope of the invention shall be determined by the technical scope of the accompanying claims.

What is claimed is:

1. A curved display device comprising:

a display substrate curved in a first direction;

an opposite substrate coupled to the display substrate, wherein the opposite substrate is curved together with the display substrate; and a liquid crystal layer comprising liquid crystal molecules disposed between the display substrate and the opposite substrate,

TABLE 2

| Embodiment 1 | Surface area of distribution area (Unit: nm$^2$) | Surface area of non-distribution area (Unit: nm$^2$) | Number of first or second large-size protrusions | Comparative Example 1 | Surface area of distribution area (Unit: nm$^2$) | Surface area of non-distribution area (Unit: nm$^2$) | Number of first or second large-size protrusions |
|---|---|---|---|---|---|---|---|
| #3 | $0.2374 \times 10^5$ | $9.7626 \times 10^5$ | 6 | #7 | $2.630 \times 10^5$ | $7.370 \times 10^5$ | 34 |
| #4 | — | — | | #8 | $2.223 \times 10^5$ | $7.777 \times 10^5$ | 33 |
| #1 | $0.5686 \times 10^5$ | $9.4314 \times 10^5$ | 37 | #5 | $1.564 \times 10^5$ | $8.436 \times 10^5$ | 19 |
| #2 | $0.7318 \times 10^5$ | $9.2682 \times 10^5$ | 32 | #6 | $1.809 \times 10^5$ | $8.191 \times 10^5$ | 51 |

wherein the opposite substrate comprises:

a common electrode; and a first alignment layer disposed on the common electrode, wherein the first alignment layer includes first protrusions for pre-tilting a first portion of the liquid crystal molecules at a first pretilt angle, wherein the display substrate comprises:

a pixel electrode disposed on each of a plurality of pixel areas, wherein a plurality of slits is defined in the pixel electrode; and a second alignment layer disposed on the pixel electrode, wherein the second alignment layer includes second protrusions for pre-tilting a second portion of the liquid crystal molecules at a second pretilt-angle, which is less than the first pretilt-angle, wherein the first alignment layer has an upper surface contacting the liquid crystal layer, and the upper surface has protruded portions to the second alignment layer, and wherein an amount of the second protrusions is larger than an amount of the first protrusions.

2. The curved display device of claim 1, wherein the first alignment layer comprises a material which fixes the liquid crystal molecules to the first alignment layer to align the liquid crystal molecules, and the second alignment layer comprises a material which fixes the liquid crystal molecules to the second alignment layer to align the liquid crystal molecules.

3. The curved display device of claim 2, wherein the first alignment layer comprises first reactive mesogens coupled to the liquid crystal molecules to align the liquid crystal at the first pretilt-angle.

4. The curved display device of claim 3, wherein the second alignment layer comprises second reactive mesogens to align the liquid crystal at the second pretilt-angle, and an amount of the second reactive mesogens in the second alignment layer is greater than an amount of first reactive mesogens in the first alignment layer.

5. The curved display device of claim 1, wherein the first pretilt-angle is in a range from about 89.6° to about 90.0°.

6. The curved display device of claim 5, wherein a difference between the first pretilt-angle and the second pretilt-angle is in a range from about 0.4° to about 1.2°.

7. The curved display device of claim 1, wherein the slits are defined in the pixel electrode in directions tilted with respect to the first direction on a plane to define a plurality of domains on each of the plurality of pixel areas, when an electric field is generated between the pixel electrode and the opposite electrode, liquid crystal alignment directions, in which the liquid crystal molecules are aligned in response to the electric field, are different from each other on the plurality of domains.

8. The curved display device of claim 7, wherein the plurality of domains comprises a first domain, a second domain, a third domain and a fourth domain, the first and second domains are arranged in the first direction, the third and fourth domains are arranged in the first direction, the first and third domains are arranged in a second direction crossing the first direction, and the second and fourth domains are arranged in the second direction.

9. The curved display device of claim 8, wherein the pixel electrode comprises:

a horizontal stem part extending in the first direction;

a vertical stem part extending in the second direction, wherein the vertical stem part is connected to the horizontal stem part;

first branch parts branched from the horizontal stem part or the vertical stem part and disposed on the first domain, wherein the first branch parts extend in a direction tilted with respect to the first and second directions on the plane;

second branch parts branched from the horizontal stem part or the vertical stem part and disposed on the second domain, wherein the first branch parts extend in a direction tilted with respect to the first and second directions on the plane;

third branch parts branched from the horizontal stem part or the vertical stem part and disposed on the third domain, wherein the first branch parts extend in a direction tilted with respect to the first and second directions on the plane; and fourth branch parts branched from the horizontal stem part or the vertical stem part and disposed on the fourth domain, wherein the first branch parts extend in a direction tilted with respect to the first and second directions on the plane.

10. The curved display device of claim 1, wherein the display substrate has a display area on which an image is display, and the display area has a curved shape curved in the first direction.

11. The curved display device of claim 1, wherein the display substrate further comprises:

a base substrate on which the pixel areas are defined; and a first protrusion comprising an insulation material, wherein the first protrusion is disposed between the base substrate and the pixel electrode to reduce a distance between the pixel electrode and the common electrode at a position thereof, and wherein the protruded portions are formed by covering the first protrusion.

12. The curved display device of claim 11, wherein the second alignment layer aligns the liquid crystal molecules at the second pretilt-angle to correspond to the position of the first protrusion.

13. The curved display device of claim 12, wherein the pixel electrode comprises:

a horizontal stem part extending in the first direction;

a vertical stem part extending in a second direction crossing the first direction, wherein the vertical stem part is connected to the horizontal stem part; and branch parts branched from the horizontal stem part or the vertical stem part to extend in a direction tilted with respect to the first and second directions on the plane, wherein the first protrusion extends in the second direction to overlap the vertical stem part on the plane.

14. The curved display device of claim 13, wherein the first protrusion has a tilted surface, which is tilted with respect to the second base substrate on a cross-section, and the liquid crystal molecules disposed on the tilted surface of the first protrusion are pretilted at the second pretilt-angle toward an uppermost side of the first protrusion on the cross-section.

15. The curved display device of claim 11, wherein the display substrate further comprises:

a second protrusion comprising an insulation material and disposed on the pixel electrode to overlap an edge of the pixel electrode, which is parallel to the second direction.

16. The curved display device of claim 15, wherein the second protrusion has a protruded surface, which is tilted with respect to the second base substrate on a cross-section, and the liquid crystal molecules disposed on the tilted surface of the second protrusion are pretilted at the second pretilt-angle toward a lower side of the tilted surface on the cross-section.

17. A curved display device comprising:

a display substrate which is curved;

an opposite substrate which is curved and disposed opposite to the display substrate; and a liquid crystal layer disposed between the display substrate and the opposite substrate, wherein the liquid crystal layer comprises liquid crystal molecules, wherein the opposite substrate comprises:

a first base substrate; and a first alignment layer disposed between the first base substrate and the liquid crystal layer, wherein the first alignment layer includes first reactive mesogens polymerized with each other, wherein the display substrate comprises:

a second base substrate;

a thin film transistor disposed on the second base substrate; and a second alignment layer disposed between the second base substrate and the liquid crystal layer, wherein the second alignment layer includes second reactive mesogens polymerized with each other, wherein an amount of the second reactive mesogens is larger than an amount of the first reactive mesogens, wherein first liquid crystal molecules of the liquid crystal molecules, which are adjacent to the first alignment layer, have a first pretilt-angle, wherein second liquid crystal molecules of the liquid crystal molecules, which are adjacent to the protruded portions of the second alignment layer, have a second pretilt-angle different from the first pretilt-angle, and wherein a difference between the first pretilt-angle and the second pretilt-angle is in a range from about 0.4° to about 1.2°.

18. The curved display device of claim 17, wherein the second pretilt-angle is in a range from about 80° to about 90°.

19. The curved display device of claim 17, wherein the first pretilt-angle is in a range from about 88° to about 90°.

20. The curved display device of claim 17, wherein the display substrate has a first curvature radius, and the opposite substrate has a second curvature radius different from the first curvature radius.

21. The curved display device of claim 17, wherein the display substrate further comprises a pixel electrode disposed on the first base substrate, and the opposite substrate further comprises a common electrode disposed on the second base substrate to face the pixel electrode.

22. The curved display device of claim 21, wherein the pixel electrode comprises:

a stem part; and a plurality of branch parts extending from the stem part.

23. The curved display device of claim 22, wherein the pixel electrode is divided into a plurality of domains based on the plurality of branch parts which extends in directions different from each other with respect to the stem part.

24. The curved display device of claim 22, wherein the branch parts in a domain of the domains extend substantially parallel to each other.

25. The curved display device of claim 24, wherein the plurality of domains comprise a first domain, a second domain, a third domain, and a fourth domain.

26. The curved display device of claim 17, further comprising:

a first polarization plate disposed on the display substrate, wherein the first polarization plate has a first transmission axis; and a second polarization plate disposed on the opposite substrate, wherein the second polarization plate has a second transmission axis, wherein a direction of the first transmission axis is substantially perpendicular to a direction of the second transmission axis.

27. A curved display device comprising:

a first base substrate which is curved;

a first alignment layer comprising a first base layer disposed on the first base substrate and a plurality of first protrusions disposed on the first base layer;

a second base substrate which is curved and disposed opposite to the first base substrate; and a second alignment layer comprising a second base layer disposed on the second base substrate and a plurality of second protrusions disposed on the second base layer, wherein the first protrusions comprise first large-size protrusions, each of which has a particle diameter of about 30 nm to about 1,000 nm, and the second protrusions comprise second large-size protrusions, each of which has a particle diameter of about 30 nm to about 1,000 nm, wherein the first base layer comprises:

a first overlapping area which overlaps the first large-size protrusions; and a first non-overlapping area which does not overlap the first large-size protrusions, wherein the second base layer comprises:

a second overlapping area which overlaps the second large-size protrusions; and a second non-overlapping area which does not overlap the second large-size protrusions, wherein a ratio of a surface area of first overlapping area to a surface area of second overlapping area is greater than zero (0) and equal to or less than $4/5$.

28. The curved display device of claim 27, wherein the number of the first large-size protrusions is less than the number of the second large-size protrusions.

29. The curved display device of claim 27, wherein a surface area of the first overlapping area is less than a surface area of the first non-overlapping area.

30. The curved display device of claim 27, wherein a ratio of a surface area of first overlapping area to a surface area of first non-overlapping area is greater than zero (0) and equal to or less than $5/10$.

31. The curved display device of claim 27, wherein the surface area of the first overlapping area in a unit area of $1.0\times10^6$ nm$^2$ defined on the first base layer is greater than about zero (0) nm$^2$ and equal to or less than about $3.5\times10^5$ nm$^2$.

32. The curved display device of claim 27, wherein the surface area of the second overlapping area in a unit area of $1.0\times10^6$ $nm^2$ defined on the second base layer is equal to or greater than about $3.0\times10^5$ $nm^2$ and equal to or less than about $1.0\times10^6$ $nm^2$.

33. A curved display device comprising:

a first base substrate which is curved;

a first alignment layer comprising a first base layer disposed on the first base substrate and a plurality of first protrusions disposed on the first base layer;

a second base substrate which is curved and disposed opposite to the first base substrate; and a second alignment layer comprising a second base layer disposed on the second base substrate and a plurality of second protrusions disposed on the second base layer, wherein the first protrusions comprise first large-size protrusions each of which has a particle diameter of about 50 nm to about 1,000 nm, and the second protrusions comprise second large-size protrusions each of which has a particle diameter of about 50 nm to about 1,000 nm, wherein the first base layer comprises:

a first overlapping area which overlaps the first large-size protrusions; and a first non-overlapping area which does not overlap the first large-size protrusions, wherein the second base layer comprises:

a second overlapping area which overlaps the second large-size protrusions; and a second non-overlapping area which does not overlap the second large-size protrusions, wherein a ratio of a surface area of first overlapping area to a surface area of second overlapping area is greater than zero (0) and equal to or less than ½.

34. The curved display device of claim 33, wherein the number of the first large-size protrusions is less than the number of the second large-size protrusions.

35. The curved display device of claim 33, wherein a ratio of a surface area of first overlapping area to a surface area of first non-overlapping area is greater than zero (0) and equal to or less than 1/10.

36. The curved display device of claim 33, wherein the surface area of the first overlapping area in a unit area of $1.0\times10^6$ $nm^2$ defined on the first base layer is greater than about zero (0) $nm^2$ and equal to or less than about $0.3\times10^5$ $nm^2$.

37. The curved display device of claim 33, wherein the surface area of the second overlapping area in a unit area of $1.0\times10^6$ $nm^2$ defined on the second base layer is equal to or greater than about $0.4\times10^5$ $nm^2$ and equal to or less than about $1.0\times10^6$ $nm^2$.

* * * * *